US011335515B2

(12) United States Patent
Banerjee et al.

(10) Patent No.: US 11,335,515 B2
(45) Date of Patent: May 17, 2022

(54) CAPACITIVE ENERGY STORAGE DEVICE AND METHOD OF PRODUCING THE SAME

(71) Applicant: MONASH UNIVERSITY, Clayton (AU)

(72) Inventors: Parama Chakraborty Banerjee, Clayton (AU); Mainak Majumder, Clayton (AU); Derrek Evan Lobo, Clayton (AU); Abozar Akbarivakilabadi, Clayton (AU)

(73) Assignee: MONASH UNIVERSITY, Clayton (AU)

( * ) Notice: Subject to any disclaimer, the term of this patent is extended or adjusted under 35 U.S.C. 154(b) by 64 days.

(21) Appl. No.: 16/644,684

(22) PCT Filed: Apr. 26, 2018

(86) PCT No.: PCT/AU2018/050379
§ 371 (c)(1),
(2) Date: Mar. 5, 2020

(87) PCT Pub. No.: WO2019/046886
PCT Pub. Date: Mar. 14, 2019

(65) Prior Publication Data
US 2020/0286688 A1    Sep. 10, 2020

(30) Foreign Application Priority Data

Sep. 7, 2017 (AU) ................................ 2017903619
Oct. 26, 2017 (AU) ................................ 2017904334

(51) Int. Cl.
*H01G 11/26*    (2013.01)
*H01G 11/52*    (2013.01)
*H01G 11/56*    (2013.01)

(52) U.S. Cl.
CPC .............. *H01G 11/26* (2013.01); *H01G 11/52* (2013.01); *H01G 11/56* (2013.01)

(58) Field of Classification Search
CPC ....................................................... H01G 11/26
See application file for complete search history.

(56) References Cited

U.S. PATENT DOCUMENTS

| 8,810,996 B2 | 8/2014 | Young et al. |
| 2006/0216586 A1 | 9/2006 | Tucholski |
| 2012/0170171 A1* | 7/2012 | Lee ........................ H01G 11/42 361/502 |
| 2014/0035098 A1 | 2/2014 | Dunn et al. |

(Continued)

FOREIGN PATENT DOCUMENTS

| CN | 102768230 A | * 11/2012 |
| CN | 204809044 U | 11/2015 |

(Continued)

OTHER PUBLICATIONS

International Search Report for corresponding application PCT/AU2018/050379 dated Jul. 3, 2018.

(Continued)

*Primary Examiner* — Eric W Thomas
(74) *Attorney, Agent, or Firm* — Norris McLaughlin PA

(57) ABSTRACT

The invention provides a capacitive energy storage device comprising: at least one porous film infiltrated with an electrolyte; and one or more pairs of separated electrodes disposed on top of a first surface of the porous film, each electrode comprising a capacitive electrode material in ionic communication with the underlying porous film, wherein the electrolyte provides ionic communication between the separated electrodes via the internal porosity of the porous film.

20 Claims, 16 Drawing Sheets

(56) References Cited

U.S. PATENT DOCUMENTS

| | | | |
|---|---|---|---|
| 2015/0235776 A1* | 8/2015 | Miller | H01G 11/28 |
| | | | 361/502 |
| 2015/0287978 A1 | 10/2015 | Gustafson et al. | |
| 2016/0064155 A1 | 3/2016 | Jiang et al. | |
| 2018/0082796 A1 | 3/2018 | Mahrholz | |

FOREIGN PATENT DOCUMENTS

| | | | | |
|---|---|---|---|---|
| CN | 106047678 A | * | 10/2016 | |
| GB | 2505447 A | * | 3/2014 | H01M 4/587 |
| WO | 2018185002 A1 | | 11/2016 | |

OTHER PUBLICATIONS

Jung, H. et al., "Direct printing and reduction of graphite oxide for flexible supercapacitors", Applied Physics Letters, 2014, vol. 105, pp. 053902-1 to 053902-5.

Xiao, Y. et al., "Gravure printing of hybrid MoS2@S-rGO interdigitated electrodes for flexible microsupercapacitors", Applied Physics Letters, 2015, 107, pp. 013906-1 to 013906-5.

EP Search Report for corresponding application EP 18853379.8 dated May 6, 2021.

Lui, L. et al., "Design and integration of flexible planar microsupercapacitors", Nano Research, Tsinghua University Press, No. 5, vol. 10, Jan. 26, 2017 pp. 1524-1544.

CN Examination Report for corresponding application CN 201880070123.9 dated Jun. 17, 2021.

JP Office Action Examination Report for corresponding application JP 2017-206973 dated Aug. 11, 2021.

Second Chinese Office Action for corresponding application CN 201880070123.9 dated Feb. 25, 2022.

Translation of Second Chinese Office Action for corresponding application CN 201880070123.9 dated Feb. 25, 2022.

* cited by examiner (a)

(b)

CAPACITIVE ENERGY STORAGE DEVICE AND METHOD OF PRODUCING THE SAME

This is an application filed under 35 USC 371 based on PCT/AU2018/050379 filed 26 Apr. 2018, which in turn is based on AU 2017903619 filed 7 Sep. 2017 and AU 2017904334 filed 26 Oct. 2017. The present application claims the full priority benefit of these prior applications and herein incorporates by reference the full disclosures of these prior applications.

TECHNICAL FIELD

The present invention relates to capacitive energy storage devices, to methods of producing capacitive energy storage devices, and to a use of porous films to produce a stacked capacitive energy storage device. In particular, the capacitive energy storage devices comprise at least one porous film infiltrated with an electrolyte, with one or more pairs of capacitive electrodes formed on the film surface and in ionic communication with the electrolyte in the internal porosity of the film.

BACKGROUND OF INVENTION

The growing impact of miniaturised electronic devices in modern life has propelled increasing research into the development of miniaturised energy storage systems. The power supply system frequently occupies more than 50% of device volume or weight, and is typically the dominant constraint on miniaturisation. Although batteries have traditionally had the advantage of relatively high energy densities, their low power capability and limited cycle life, and challenges in reducing scale while maintaining electrochemical performance, have led to increasing interest in high performance supercapacitors as battery alternatives. These devices provide balanced energy and power densities, rapid charge/discharge capability (orders of magnitude higher than faradaic devices), extended lifetimes, maintenance-free operation and low environmental impact. Supercapacitors are thus attractive energy sources for many applications, either alone or when integrated with battery systems.

Traditional supercapacitors are fabricated by coating metal current collector foils, having a thickness typically greater than 100 microns, with porous carbon electrode materials. Two such electrodes are then assembled face-to-face, with an interposed porous separator to provide electrical insulation but permit ionic communication, as depicted in FIG. 1. An electrolyte saturates the separator and the electrodes, while the device is electrically connected to the external circuit via the current collectors. The porous electrodes store charge in the form of ions primarily located in the electrical double layer of the high surface area carbon electrode material. Such devices are therefore known as electrical double layer (EDL) supercapacitors.

In such EDL supercapacitors, the electrode separation distance is governed by the thickness of the separator, and the electrodes are thus spaced apart by at least 50-100 microns. The relatively long distance traversed by ions during charging and discharging limits the power density of the device. Furthermore, the large surface area of the electrodes, typically extending over the cross-sectional area of the supercapacitor device and thus in the $mm^2$ to $cm^2$ range, necessitates the use of metallic current collectors for efficient electron transport between the electrodes and the external circuit. The current collectors, the separator and the interfaces between components thus contribute to dead volume, increased weight and reduced flexibility of the device.

To address these disadvantages, an in-plane electrode geometry has been developed to provide micro-supercapacitors having improved energy density relative to traditional supercapacitors. In these devices, an insulating substrate is typically patterned with a conductive metallic pad in the required electrode geometry, and an electrode material is deposited on the pads by electrochemical deposition or other techniques. An electrolyte layer deposited on the substrate provides ionic communication between the electrodes across the surface, while the metallic pad acts as the current collector. While such approaches avoid some of the limitations of the traditional electrode-separator-electrode configuration, the accessible electrode resolution is generally insufficient to fabricate electrode separation distances in the 1-50 microns range, and a complex, multi-step process is required for fabrication.

Recently, a direct "writing" approach has allowed the fabrication of true micron-scale electrodes with an in-plane configuration. In this technique, an insulating graphene oxide layer is coated onto a substrate and an electrode is "written" into the layer with a focused beam that selectively reduces graphene oxide to conductive, high surface area graphene. The resultant graphene electrodes are separated by intermediate graphene oxide, capable of retaining the electrolyte reservoir needed for ionic communication between the electrodes. Both lasers and focused ion beams have thus been used to transcribe interdigitated electrodes with high resolution, as described in El Kady et al, *Nature Communications* 2013, 4, 1475 and Lobo et al, *Advanced Energy Materials* 2015, 19, 1500665.

In the latter study, electrodes with an inter-electrode separation distance of as low as 1 microns were fabricated, with a resultant areal capacitance of over 100 mFcm$^{-2}$ and ultrafast cycling response. This excellent performance was attributed to the micron-scale resolution of the electrodes, and in particular to the switch in kinetic control from a linear diffusion to a radial diffusion ion transport mechanism that occurs below a critical electrode dimension, which dimension is believed to be below 50 microns.

Although this study has demonstrated micro-supercapacitors with energy densities higher even than thin film lithium ion batteries, yet with vastly superior power density and cyclability, the direct writing approach is challenging to scale up to industrial production due to the reliance on beam reduction techniques. Moreover, the direct writing technique is a slow process and uses expensive electrode material relatively inefficiently, as the porous GO layer serves as both the electrode precursor (subsequently reduced to form the electrode) and as an insulating spacer between the reduced electrodes. Furthermore, as a result of the beam-reduction technique, the substrates have been limited to non-porous materials such as silicon wafers. As a result, the micro-supercapacitors are undesirably rigid, limiting their applicability for flexible electronic devices. Moreover, the reservoir of electrolyte resides only above the substrate surface plane, typically as a layer of gel electrolyte on top of the substrate which adds thickness to the device and thus reduces the volumetric power and energy densities.

There is therefore an ongoing need for improved capacitive energy storage devices having excellent energy and/or power densities and methods of producing such devices, which address one or more of the above-mentioned shortcomings.

A reference herein to a patent document or other matter which is given as prior art is not to be taken as an admission that the document or matter was known or that the information it contains was part of the common general knowledge as at the priority date of any of the claims.

SUMMARY OF INVENTION

The inventors have now developed a capacitive energy storage device, and a method for producing the same, wherein a capacitive electrode material applied to a porous film forms pairs of separated electrodes on top of a surface of the film. The film, generally having properties analogous to those of a separator in a conventional supercapacitor, is sufficiently porous to act as a reservoir for an electrolyte such that, in use, ionic communication is provided between the separated electrodes via the internal porosity of the film. The ionic conductivity pathway through the interior of the film, optionally supplemented by further ionically conductive pathways across the film surface and/or through an overlaid porous film in a multi-layered stack, is believed to enhance the electrochemical performance of the device, since electrolyte accessibility to the microelectrodes from multiple directions decreases electrolyte diffusion related resistances. Additionally or alternatively, utilisation of a porous substrate as a reservoir for the electrolyte allows the thickness of an overlying layer of electrolyte on top of the substrate to be minimised, or for such a layer to be entirely absent. The volume of the device is thus reduced while maintaining satisfactory ionic conductivity between the electrodes. Furthermore, the porosity of the film is considered to facilitate the fabrication of the electrodes in high resolution, as will be described in greater detail hereafter.

Therefore, in accordance with a first aspect the invention provides a capacitive energy storage device comprising: at least one porous film infiltrated with an electrolyte; and one or more pairs of separated electrodes disposed on top of a first surface of the porous film, each electrode comprising a capacitive electrode material in ionic communication with the underlying porous film, wherein the electrolyte provides ionic communication between the separated electrodes via the internal porosity of the porous film.

The porous film generally has two surfaces on opposing sides of the film. As used herein, the "first surface" and the "reverse surface" of the porous film are terms used to refer to and differentiate these opposing surfaces, and do not in themselves imply any difference between the surfaces.

The porous film has an internal porosity that communicates with at least the first surface, and typically with both the first and reverse surfaces. The internal porosity of a porous material refers to the internal voids, or pores, distributed through the solid matrix. The pores of the porous film are interconnected, such that the porous film is permeable to liquids and may thus be infiltrated with an electrolyte. As will be appreciated by the skilled person, the internal porosity of a porous film may be characterised by parameters such as pore size, porosity (also known as void fraction, i.e. the fraction of the total volume occupied by the pores) and surface area.

In some embodiments, at least 80%, and preferably at least 90% or substantially all of the total electrolyte is infiltrated within the internal porosity of porous films in the capacitive energy storage device. Thus, the space in the device occupied by discrete layers of electrolyte is kept to a minimum.

As used herein, "pairs of separated electrodes disposed on top of a first surface of a porous film" refers to pairs of electrically isolated electrodes having three-dimensional physical structures that are formed at least partially above, and thus protrude from, a continuous surface of an underlying porous film, and which are separated by an portion of the porous film surface intermediate the electrodes. The electrodes comprise a capacitive electrode material in ionic communication with the underlying porous film. It will be appreciated that the capacitive electrode material is in ionic communication with the underlying porous film when electrolyte ions are able to move between the electrode and the internal porosity of an underlying portion of the porous film via the porous film surface. Although the capacitive electrode material may in preferred embodiments be in direct contact with and/or adhered or bonded to the surface of the first porous film, it will be appreciated that the requirement for "ionic communication" does not exclude non-adhesive abutting engagement, partial penetration of the capacitive electrode material into the internal porosity of the film, or other modes of engagement whereby ionic communication is suitably provided.

In some embodiments, the pairs of separated electrodes have an inter-electrode separation distance of less than about 50 microns, and preferably less than or equal to 30 microns. As used herein, the inter-electrode separation distance is the minimum distance across the portion of the first surface of the porous film intermediate the separated electrodes, which ensures that the electrodes are electrically isolated from each other. A small inter-electrode separation distance reduces the diffusion length scale for the ions and thereby provides improved time and frequency response and/or improved power density. In some embodiments, the pairs of separated electrodes have an inter-electrode separation distance of less than the thickness of the porous film. Such a separation distance inherently cannot be obtained with a conventional supercapacitor design, where the electrodes are disposed on either side of a porous separator film.

In some embodiments, each pair of separated electrodes, including both the electrodes themselves and the inter-electrode separation area, covers a surface area on the porous film of less than about 1 $mm^2$, such as less than 0.5 $mm^2$. As used herein, the inter-electrode separation area is the area of the first surface of the porous film intermediate the separated electrodes, which ensures that the electrodes are electrically isolated from each other. Advantageously, in such small electrodes the charge transport kinetics are considered to be controlled by radial diffusion mechanisms, resulting in improved capacitance and energy density. Additionally, such electrodes possess sufficient electrical conductivity and do not require additional current collectors, i.e. foils or other metallic layers covering the in-plane area of the electrode. In some embodiments, therefore, the electrodes of the capacitive energy storage device are electrically connected to adjacent electrodes and/or an external circuit without a metallic current collector.

In some embodiments, the pairs of separated electrodes comprise interdigitated electrodes, each electrode having from two to six fingers, preferably from three to five fingers, such as four fingers. Each finger may have a width of less than about 50 microns and a length of less than about 250 microns.

In some embodiments, the electrodes have an out-of-plane thickness of between about 25 nm and about 1 microns. As used here, the out-of-plane thickness refers to the distance by which the electrodes protrude from the first surface of the porous film.

In some embodiments, multiple pairs of the separated electrodes are disposed on top of the first surface of the porous film, the multiple pairs of the separated electrodes being electrically connected in series and/or in parallel. Depending on the energy and power requirement for any particular application, a wide variety of electrode pair configurations may be provided on a porous film, including multiple electrode pairs in parallel, multiple electrode pairs in series, blocks of parallel-connected electrode pairs connected in series, and the like. As will be appreciated by the skilled person, the total capacitance of electrode pairs in parallel increases as the sum of the individual electrode pair capacitances. By contrast, a series combination of electrode pairs decreases the total capacitance, but the applied voltage increases linearly with the number of electrode pairs. Since, the energy density of a capacitor is directly proportional to the square of the applied voltage, the energy density of the device increases linearly with the increase in the number of the electrode pairs connected in series.

Moreover, it will be appreciated that efficient utilisation of the surface area of the porous substrates is provided by maximising the number of the pairs of separated electrodes within a given area of the first surface of the substrate, thereby minimising the unutilised spaces between electrode pairs. In some embodiments, more than 10 electrode pairs, and preferably more than 50 electrode pairs, such as more than 80 electrode pairs, are disposed on top of the first surface of the porous film per $cm^2$ of the surface. In this manner, the dead volume in the device is reduced and the energy and power densities per unit device volume maximised.

In some embodiments, the multiple pairs of the separated electrodes are electrically connected by conductive linkages on the first surface of the porous film, the conductive linkages also comprising the capacitive electrode material. In these or other embodiments, the pairs of separated electrodes or the electrically connected multiple pairs of separated electrodes are provided with electrical contacts for electrical connection to an external circuit, the electrical contacts also comprising the capacitive electrode material. Such embodiments advantageously simplify the fabrication of the device, as an extended network of electrically connected electrode pairs, configured for connection to an external circuit, may be produced on the porous film by applying a single conductive material (or reducible precursor thereof), typically in a single printing step. Preferably, the length of the conductive linkages between electrode pairs is kept to a minimum to minimise the voltage drop across the linkages, so that the power performance of the device is not compromised. In this context, it will be appreciated that in other embodiments the conductive linkages between pairs of electrodes on the same porous film, or the electrical contacts for connection to an external circuit, may comprise other conductive materials, including metals. This may be preferred, for example, to reduce the internal resistance of the energy storage device.

In some embodiments, a plurality of the porous films are stacked such that the one or more pairs of the separated electrodes disposed on top of the first surface of a first porous film are in contact with, for example in abutting engagement with, a reverse surface of a second porous film stacked above the first porous film. It is preferred that the contact provides ionic communication between the electrodes and the reverse surface. When a plurality of the porous films is stacked in this manner, the separated electrodes of the first film are sandwiched between and in ionic communication with two porous films, each of which is infiltrated with an electrolyte. The electrolyte may thus provide ionic communication pathways between the separated electrodes via the internal porosity of both the first and the second porous film. The electrodes are effectively surrounded on all sides by a reservoir of electrolyte, including the electrolyte contained within the first and second porous film, further enhancing the electrochemical performance while minimising the dead volume of the capacitive energy storage device. Moreover, particularly when the porous films are flexible membranes, the films may be stacked with substantially no gap between them, since the adjacent porous films conform closely around the sandwiched electrodes. At least 90%, and preferably substantially all of the total electrolyte in the device may thus be infiltrated within the internal porosity of the stacked porous films. The volumetric energy and power densities of the device are thus increased.

Two, or more than two, porous films may be stacked. It will be apparent to the skilled person that, where more than two porous films are stacked, each porous film with both upper and lower neighbours in the stack may be both a first porous film as defined, in that one or more pairs of the separated electrodes disposed on its first surface are in contact with a reverse surface of its upper neighbour, and a second porous film as defined, in that its reverse surface is in contact with one or more pairs of its lower neighbour's separated electrodes.

In some embodiments where a plurality of the porous films are stacked, at least one of the separated electrodes disposed on the first surface of the first porous film is electrically connected via a conductive pathway with at least one of the separated electrodes disposed on the first surface of the second porous film. In this manner, the energy storage device may comprise a three-dimensionally extended network of electrode pairs, connected in series and/or in parallel, over the thickness of the stack.

In some embodiments, the conductive pathway comprises a conductive material in an opening that extends through the thickness of the second porous film. The conductive material thereby penetrates through the second porous film and is typically in electrical communication with the electrical contacts of the connected electrodes on the first and second porous films. The conductive material may comprise a cured resin comprising dispersed metal, preferably a silver-filled epoxy.

The at least one porous film is typically a polymeric porous film, and is preferably a flexible polymeric membrane, thus providing for the use of the capacitive energy storage device in flexible electronics applications. The thickness of the porous film may be less than 100 microns, preferably less than 50 microns, most preferably less than 30 microns. In general, volumetric energy and power densities of the device are increased by reducing the thickness of the film.

In some embodiments, the flexible polymeric membrane comprises a porous material suitable for use as a separator in an electrochemical device such as a conventional supercapacitor or lithium ion battery. The flexible polymeric membrane may comprise at least one selected from the group consisting of polyvinylidene difluoride, polyvinyl chloride, nylon, and polyethylene terephthalate. In a preferred embodiment, the flexible polymeric membrane comprises polyvinylidene difluoride.

In some embodiments, the capacitive electrode material comprises at least one selected from the group consisting of a carbon-based electrode material or a pseudocapacitive electrode material. In some embodiments, the capacitive electrode material comprises a carbon-based electrode material such as reduced graphene oxide, graphene, exfoliated graphite, porous carbon and activated carbon. Electrodes comprising reduced graphene oxide as the capacitive electrode material, which may be conveniently formed from graphene oxide and subsequently reduced on the porous film surface, are particularly preferred. As will be described in greater detail hereafter, the capacitive electrode material is generally printed on the porous film.

In some embodiments, the electrolyte is a gel electrolyte, which may optionally comprise a cross-linked polyvinyl alcohol, typically in combination with strongly acidic or basic electrolyte salt such as KOH, $H_2SO_4$ or $H_3PO_4$. As another example, polyethylene-oxide-based gel electrolytes may also be suitable. Although gel electrolytes are currently preferred for their ability to provide an all solid-state but flexible energy storage device and their potential to provide supplementary ionically conductive pathways between the electrodes across the film surface, it is also envisaged that liquid electrolytes at least partially retained within the porosity of the porous films may be used, including aqueous, non-aqueous and ionic liquid electrolytes.

As described herein, particularly advantageous embodiments of the capacitive energy storage device according to the invention have a stacked configuration. Such devices may have one or more of high energy density, high power density, and fast cycling response due to the micro-scale size of the electrode pairs, the availability of multiple ionically conductive pathways between electrodes pairs via the internal porosity of both overlying and underlying porous films, the possibilities for producing a wide variety of three-dimensionally extended networks of electrode pairs connected in series and/or in parallel over the thickness of the stack, and the lack of volume-filling components such as current collectors or thick electrolyte layers overlying the electrodes.

Therefore, according to a further aspect, the invention provides a stacked capacitive energy storage device comprising: a first porous film; one or more pairs of separated electrodes disposed on top of a first surface of the first porous film, each electrode comprising a capacitive electrode material in ionic communication with the underlying first porous film; a second porous film stacked above the first porous film such that the one or more pairs of the separated electrodes disposed on top of the first surface of the first porous film are in contact with a reverse surface of the second porous film; and an electrolyte in the internal porosity of the first and second porous films.

Each of the first and second porous films has a first and a reverse surface. When stacked, the reverse surface of the second porous film faces, and is typically in direct contact with, the first surface of the first porous film.

In some embodiments, the capacitive electrode material is in ionic communication with the reverse surface of the second porous film. In use, the electrolyte may thus provide ionic communication between the separated electrodes via the internal porosity of both of the first and the second porous films.

In some embodiments, the stacked capacitive energy storage device further comprises one or more pairs of separated electrodes disposed on top of a first surface of the second porous film, each electrode comprising a capacitive electrode material in ionic communication with the underlying second porous film.

In some such embodiments, at least one of the separated electrodes disposed on top of the first surface of the first porous film is electrically connected via a conductive pathway with at least one of the separated electrodes disposed on top of the first surface of the second porous film.

It will be appreciated that other optional or advantageous features described herein for embodiments of the capacitive energy storage device of the invention may be similarly characteristic of embodiments of the stacked capacitive energy storage device. Such features include the properties of the porous films, the composition and geometries of the electrode pairs on the first surface of the films, the composition of the electrolyte, and the electrical connections between electrode pairs on the same surface or the surfaces of adjacently stacked films.

The capacitive energy storage devices of the present invention are provided by a method developed by the inventors for producing the device. The method of the invention provides for the formation of separated electrodes, including in high resolution, on the surface of a porous film, with ionic communication between the electrodes provided at least in part via the internal porosity of the porous film.

Therefore, according to a further aspect, the invention provides a method of producing a capacitive energy storage device, the method comprising: applying a capacitive electrode material or precursor to a first surface of a porous film to form one or more pairs of separated electrodes disposed on top of the first surface; and infiltrating the porous film with an electrolyte, wherein the electrolyte provides ionic communication between the separated electrodes via the internal porosity of the porous film.

In some embodiments, an ink comprising the capacitive electrode material or precursor is printed onto the first surface. The porosity of the film is considered to facilitate the fabrication of micro-scale electrodes in these preferred embodiments. Without wishing to be bound by any theory, it is believed that the continuous phase of the ink is rapidly wicked into the pores of the film upon application, thereby preventing the spreading and coalescing of the ink even when electrodes with very small dimensions and a narrow inter-electrode distance are printed.

In some embodiments, the ink is printed onto the first surface via gravure or flexogravure, and preferably gravure, printing. The inventors have discovered that electrodes with micron-scale features may surprisingly be printed onto the surface of porous films conventionally used as separators using such printing techniques. Excellent resolution and reproducibility may be thereby obtained when employing a suitably viscous ink comprising dispersed electrode material or precursor. Furthermore, without wishing to be bound by any theory, it is believed that gravure printing produces shear-induced alignment of the electrode material or precursor forming the electrode, thereby providing favourable ionic conductivity into the electrode interior during cycling of the energy storage device.

The viscosity of the ink should preferably be in a range suitable to permit gravure or flexogravure printing, and to limit or avoid penetration of the capacitive electrode material or precursor into the interior of the porous film. The ink may thus have a viscosity of between about 25 Pa s and about 100 Pa s when printed onto the first surface. It will be appreciated that a suitable concentration of capacitive electrode material or precursor in an ink for printing the electrodes of the invention will depend on the nature of the material and the carrier fluid. In one embodiment, the ink has have a concentration of between about 1 and 5 mass %, such as approximately 3 mass %, of capacitive electrode material or precursor.

In some embodiments, the method of the invention further comprises providing the ink for printing onto the first surface. Providing the ink may comprise concentrating a dispersion of the capacitive electrode material or precursor to increase the viscosity thereof. In a preferred method, the capacitive electrode material or precursor is dispersed in an aqueous continuous phase of the dispersion and the dispersion is concentrated by: i) contacting the dispersion with a water-absorbent solid, such as beads of a super-absorbent polymer, to absorb water from the aqueous continuous phase into the water-absorbent solid; and ii) thereafter, separating the dispersion from the water-absorbent solid. The inventors have discovered that concentrated graphene oxide inks, having suitable viscosities for gravure printing, may be conveniently prepared in this manner, thereby avoiding the challenges of directly preparing concentrated graphene oxide dispersions or concentrating dilute dispersions by volatilisation of the aqueous phase.

In some embodiments, the separated electrodes formed by applying the capacitive electrode material or precursor according to the method of the invention have an inter-electrode separation distance of less than 50 microns, preferably less than or equal to 30 microns. Moreover, each pair of separated electrodes thus formed, including both the electrodes themselves and the inter-electrode separation area, may cover a surface area on the porous film of less than 1 $mm^2$.

In some embodiments, applying the capacitive electrode material or precursor comprises forming multiple pairs of the separated electrodes disposed on top of the first surface of the porous film, the multiple pairs of separated electrodes being connected in series and/or in parallel by linkages comprising the capacitive electrode material or precursor. In some such embodiments, applying the capacitive electrode material or precursor further comprises forming electrical contacts for electrical connection to an external circuit, the electrical contacts also comprising the capacitive electrode material. The electrodes, the linkages and the electrical contacts may be printed onto the first surface in the same printing step.

In some embodiments, for example where an electrode precursor material such as graphene oxide is applied to form the electrodes, the method further comprises reducing the capacitive electrode material or precursor on the first surface of the porous film to increase the conductivity thereof. The capacitive electrode material or precursor may be reduced by any suitable technique, including chemical, thermal, photo-thermal and beam reduction techniques. In some embodiments, the capacitive electrode material or precursor is reduced by exposure to a chemical reductant, such as hydroiodic acid.

In some embodiments, the method further comprises stacking a plurality of the porous films such that the one or more pairs of the separated electrodes disposed on top of the first surface of a first porous film are in contact with, for example in abutting engagement with, a reverse surface of a second porous film stacked above the first porous film. It is preferred that the contact provides ionic communication between the electrodes and the reverse surface.

In some such embodiments, the method further comprises electrically connecting via a conductive pathway at least one of the separated electrodes disposed on top of the first surface of the first porous film with at least one of the separated electrodes disposed on top of the first surface of the second porous film. Electrically connecting the electrodes may comprise producing the conductive pathway through the thickness of the second porous film, for example by placing a conductive material into an opening extending through the thickness of the second porous film. The conductive material may be printed, drop-cast or injected onto the first surface of the second film and/or into the opening therein. In some embodiments, the conductive material comprises a curable resin comprising dispersed metal, preferably a room temperature curable resin and preferably a silver-filled epoxy. Once the curable resin has penetrated through the thickness of the second porous film, the resin may be cured to adhere the first porous film to the second porous film.

The method of the invention thus provides an industrially scalable step-wise method for producing a stacked multi-layer energy storage device using readily available microfabrication techniques. In particular, the device may be fabricated by stacking a second porous film above a first porous film, wherein an electrical contact of at least one of the separated electrodes disposed on the second porous film is placed in suitable vertical alignment with an electrical contact of at least one of the separated electrodes disposed on the first porous film. A curable resin comprising dispersed metal is then placed into an opening in the second porous film which passes through or adjacent to the electrical contact of the electrode on the second porous film. The curable resin is optionally also placed onto areas of the first surface of the second porous film adjacent to the opening, to ensure that an adequately conductive connection is made with the electrical contact. The opening, which may be a hole with a diameter of less than 1 mm, such as about 0.8 mm, may be produced in the second porous film either before or after forming the electrodes and electrical contact thereon, but preferably after. The conductive resin penetrates through the opening and contacts the electrical contact of the electrode on the first porous film. The resin is then cured to create a permanent electrical connection between the electrodes in the adjacent layers of the stack, and to adhere the layers together. Once all required electrical connections between electrodes of the first and second porous films have been produced in this manner, a third porous film may stacked above and electrically connected to the second porous film as described herein. In this manner, a multilayered stack comprising two, three, four, five or even more layers may be produced.

Although the porous films may optionally be saturated with electrolyte before stacking, in some preferred embodiments the plurality of porous films are only infiltrated with the electrolyte after stacking the porous films, and generally also after establishing electrical connections between the layers in the stack as described herein. It is considered to be an advantage of the present invention that a stacked and electrically connected capacitive energy storage device may be infiltrated with electrolyte post-fabrication, as a result of the permeable nature of the films in the stack.

In some embodiments, the porous film, or plurality of stacked porous films, is infiltrated with a low viscosity curable electrolyte to allow penetration into the device. The curable electrolyte may have a viscosity, when infiltrated into the film, of below about 10 Pa s, preferably below about 1 Pa s. In such embodiments, the method further comprises curing the low viscosity curable electrolyte to produce a gel electrolyte, once the film or films are suitably infiltrated. In some embodiments, the low viscosity curable electrolyte comprises cross-linkable polyvinyl alcohol, typically in combination with strongly acidic or basic electrolyte salt such as KOH, $H_2SO_4$ or $H_3PO_4$. Such curable electrolytes may be gelled by a thermal treatment or at room temperature.

In some embodiments, the porous film to which the capacitive electrode material or precursor is applied is a polymeric porous film, and is preferably a flexible polymeric membrane. The flexible polymeric membrane may comprise a porous material suitable for use as a separator in an electrochemical device such as a conventional supercapacitor or lithium ion battery. The flexible polymeric membrane may comprise at least one selected from the group consisting of polyvinylidene difluoride, polyvinyl chloride, nylon, and polyethylene terephthalate. In a preferred embodiment, the flexible polymeric membrane comprises polyvinylidene difluoride.

In some embodiments, the capacitive electrode material or precursor comprises at least one selected from the group consisting of a carbon-based electrode material, a pseudo-capacitive electrode material or a precursor of either of these. In some embodiments, the capacitive electrode material or precursor comprises graphene oxide.

In such embodiments, the method comprises reducing the capacitive electrode material or precursor on the first surface of the porous film to increase the conductivity thereof. In embodiments where graphene oxide is applied to the first surface of the porous film to form the electrodes, the graphene oxide is reduced, for example by chemical reduction, to produce conductive reduced graphene oxide.

According to a further aspect, the invention provides a capacitive energy storage device, produced according to the method of any of the embodiments disclosed herein.

As described herein, a particularly advantageous application of the electrode-functionalised porous films of the invention is the production of stacked multi-layer energy storage devices.

According to a further aspect, therefore, the invention provides use of a plurality of porous films, each porous film comprising one or more pairs of separated electrodes disposed on top of a first surface of the porous film and comprising a capacitive electrode material in ionic communication with the first surface, to produce a capacitive energy storage device, the use comprising: stacking the porous films such that the one or more pairs of the separated electrodes disposed on top of the first surface of a first porous film are in contact with a reverse surface of a second porous film stacked above the first porous film; and infiltrating the porous films with an electrolyte. When charging and discharging the capacitive energy storage device thus produced, the electrolyte provides ionic communication between the separated electrodes via the internal porosity of the porous films.

The contact may, for example, be via an abutting engagement. It is preferred that the contact provides ionic communication between the electrodes disposed on top of the first surface of a first porous film and the reverse surface of the second porous film. When charging and discharging the capacitive energy storage device thus produced, the electrolyte provides ionic communication between the separated electrodes via the internal porosity of both the first and the second porous films.

In some embodiments, the use further comprises electrically connecting via a conductive pathway at least one of the separated electrodes disposed on top of the first surface of the first porous film with at least one of the separated electrodes disposed on top of the first surface of the second porous film. In some such embodiments, electrically connecting the electrodes comprises placing a conductive material into an opening extending through the thickness of the second porous film to produce the conductive pathway. In some embodiments, the porous films are infiltrated with the electrolyte after stacking the porous films and electrically connecting the electrodes.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

As used herein, the terms "first", "second", "third" etc in relation to various features of the disclosed embodiments are arbitrarily assigned and are merely intended to differentiate between two or more such features that may be incorporated in various embodiments. The terms do not of themselves indicate any particular orientation or sequence. Moreover, it is to be understood that the presence of a "first" feature does not imply that a "second" feature is present, the presence of a "second" feature does not imply that a "first" feature is present, etc.

Further aspects of the invention appear below in the detailed description of the invention.

BRIEF DESCRIPTION OF DRAWINGS

Embodiments of the invention will herein be illustrated by way of example only with reference to the accompanying drawings in which.

DETAILED DESCRIPTION

Figure 1:
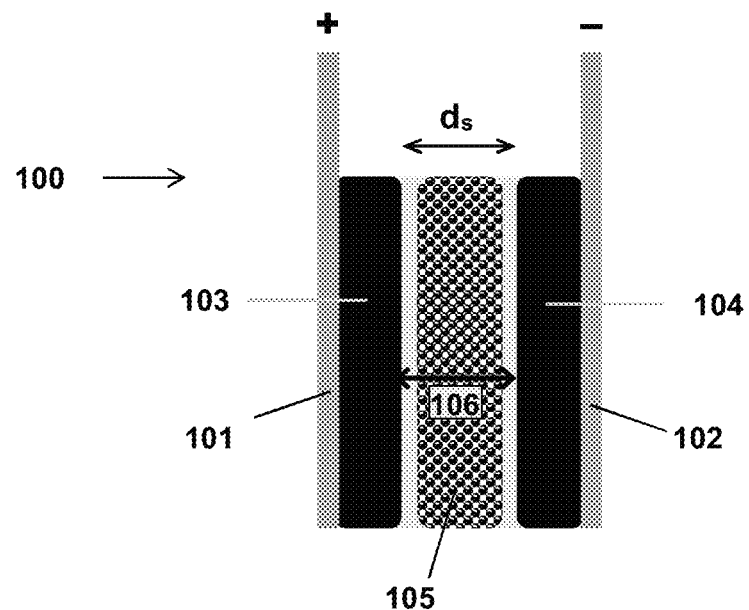
FIG. 1 is a schematic drawing of a conventional supercapacitor configuration reported in the prior art.

The present invention relates to a capacitive energy storage device, to methods of producing capacitive energy storage devices, and to a use of porous films to produce a stacked capacitive energy storage device. The capacitive energy storage device of the invention comprises at least one porous film infiltrated with an electrolyte, and one or more pairs of separated electrodes disposed on top of a first surface of the porous film. Each electrode comprises a capacitive electrode material in ionic communication with the underlying porous film. In use, such as when charging or discharging the device via an external circuit, the electrolyte provides ionic communication between the separated electrodes via the internal porosity of the porous film.

Porous Film

The capacitive energy storage device comprises at least one porous film. The thickness of the porous film may be less than 100 microns, preferably less than 50 microns, and most preferably less than 30 microns.

The porous film is typically a membrane comprising a porous material, as is suitable for use as a separator in an electrochemical device such as a conventional supercapacitor or lithium ion battery. In addition to the porosity, such materials are generally sufficiently chemically stable to avoid degradation in the presence of acidic or alkaline electrolytes, sufficiently thermally stable to withstand an accidental rise in temperature during operation, and wettable by the electrolyte.

The porous film is typically a polymeric porous film, and may comprise at least one selected from the group consisting of polyvinylidene difluoride, polyvinyl chloride, nylon, and polyethylene terephthalate. Porous polyolefin, such as polyethylene and/or polypropylene, films are also contemplated since such films are commercially used as separators in lithium ion batteries. In a preferred embodiment, the flexible polymeric membrane comprises, or consists essentially of, polyvinylidene difluoride.

The pore size of the porous film may be between 0.1 and 0.5 microns, preferably between 0.1 and 0.3 microns, such as approximately 0.2 microns. By analogy with the requirements for a lithium ion battery separator, the inventors believe that an interior porosity of the porous film of at least about 20%, such as at least about 30%, for example between about 30% and about 50%, is preferred. The pore size and porosity of the porous film may be measured using liquid or gas adsorption methods, such as according to the American Society for Testing Materials (ASTM) D-2873.

Capacitive Electrode Material

The separated electrodes on the porous film surface comprise a capacitive electrode material. The capacitive electrode material may include either or both of a carbon-based electrode material and a pseudocapacitive electrode material. It will be appreciated that carbon-based electrode materials, which typically have both high surface areas (such as between about 100 and 2500 $m^2/g$) and high conductivity, are particularly suitable for electric double-layer capacitors (EDLC devices), in which energy storage primarily occurs by separation of charge in a Helmholtz double layer at the interface between the surface of the conductive electrode material and the electrolyte. Pseudocapacitive materials, by comparison, store energy via rapidly reversible redox or intercalation processes involving electrolyte ions that occur at the surface of the electrode material.

The capacitive electrode material may comprise a carbon-based electrode material such as reduced graphene oxide, graphene, exfoliated graphite, porous carbon and/or activated carbon. Electrodes comprising reduced graphene oxide as the capacitive electrode material, which may be conveniently formed from graphene oxide and subsequently reduced on the porous film surface, are particularly preferred. Suitable pseudocapacitive electrode materials include conductive polymers, transition metal oxides, and metal nanoparticles. It is envisaged that the separated electrodes of the invention may include both a carbon-based electrode material such as reduced graphene oxide, and a pseudocapacitive material.

Electrolyte

The capacitive energy storage device includes an electrolyte infiltrated into the internal porosity of the porous film. The electrolyte may be a liquid electrolyte, including ionic liquids or electrolytes comprising an organic solvent and a suitably soluble salt.

The electrolyte may be a gel electrolyte, for example an electrolyte comprising a base polymer such as cross-linked polyvinyl alcohol or polyethylene oxide. Such electrolytes may be particularly preferred for flexible capacitive energy storage devices. The gel electrolyte may comprise strongly acidic or basic electrolyte salts such as $KOH$, $H_2SO_4$ or $H_3PO_4$.

The present invention also relates to a method for producing a capacitive energy storage device. The method comprises applying a capacitive electrode material or precursor to a first surface of a porous film to form one or more pairs of separated electrodes disposed on top of the first surface. The porous film is infiltrated with an electrolyte, such that ionic communication is provided between the separated electrodes via the internal porosity of the porous film.

Printing the Electrodes

The capacitive electrode material or precursor may be applied to the first surface by any suitable method capable of forming the electrodes. In preferred embodiments, the capacitive electrode material or precursor is applied by printing an ink comprising the capacitive electrode material or precursor onto the porous film surface.

The ink may be printed onto the first surface via an intaglio print technique such as gravure printing. As will be appreciated by the skilled person, gravure (or rotogravure) printing refers to a printing method whereby an ink is applied to an engraved, etched or otherwise microstructured printing surface, such as a printing sheet, a gravure cylinder or a roller-mounted shim. Excess ink is generally wiped off the printing surface, which is then brought into contact with the substrate. This is typically achieved by feeding the flexible substrate around an application roller, thus bringing it into rolling contact with the printing surface. The ink in the printing surface recesses is then transferred to the substrate.

Gravure printing, and related techniques such as flexogravure, are particularly preferred for printing microstructures in high resolution, since a viscous ink may be used which does not readily coalesce on the porous film surface. By contrast, techniques such as ink-jet printing which use low viscosity jettable inks, while potentially suitable for producing larger-size electrodes in accordance with the invention, may be less suitable or unsuitable for producing finely resolved electrodes structures where radial diffusion ion transport mechanisms advantageously predominate. Furthermore, without wishing to be bound by any theory, it is believed that gravure printing produces favourable shear-induced alignment of the electrode material or precursor in the electrode structure.

The viscosity of the ink should be in a range suitable to permit the formation of high resolution electrode structures via gravure printing, and to limit or avoid penetration of the capacitive electrode material or precursor into the interior of the porous film. Suitable ink viscosities include those between about 25 Pa s and about 100 Pa s.

Inks with such viscosities may in some cases not be readily accessible by simply dispersing a suitable capacitive electrode material or precursor in a carrier fluid at the required concentration, or by evaporating the carrier fluid from a dilute dispersion. The inventors have discovered that sufficiently viscous water-based inks for gravure-printing of microelectrodes may be provided by contacting a dilute aqueous dispersion of capacitive electrode material or precursor with a water-absorbent solid such as super-absorbent polymer beads. The water-absorbent solid absorbs water from the aqueous continuous phase, and may then be separated from the concentrated, viscous dispersion that remains.

By gravure printing electrodes with suitably viscous, graphene oxide-containing ink prepared in this manner, electrodes with line widths of approximately 50 microns, and electrode pairs having an inter-electrode separation distance of less than or equal to 30 microns and covering a surface area on the porous film of less than 1 $mm^2$, may be produced.

Figure 27:
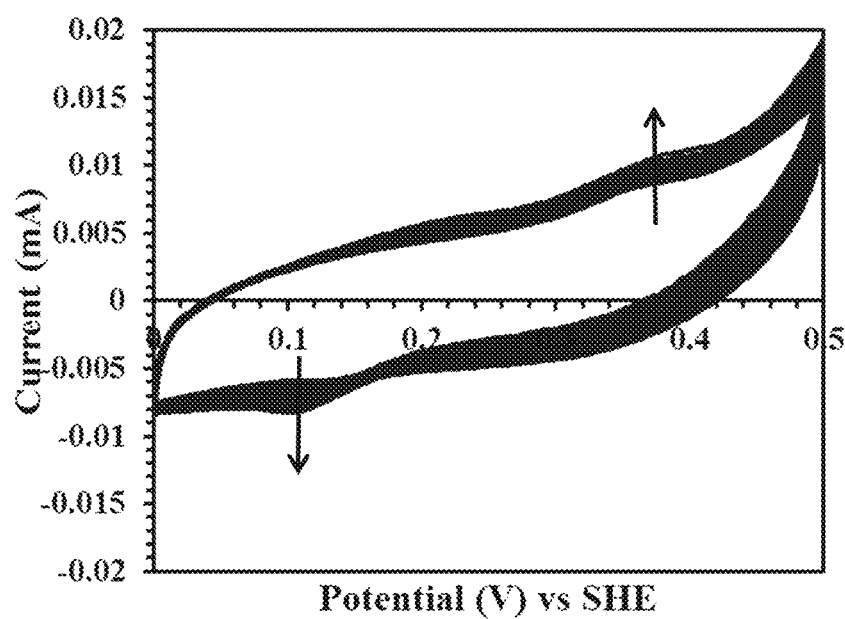
FIG. 27 is a graph of the response of the stacked, electrically connected and electrolyte-infiltrated storage device of Example 4.

Electrodes with a wide variety of geometries may be printed in accordance with the invention. Suitable electrode pair geometries include interdigitated, pad (rectangular), concentric, zigzag, L-shape and maze geometries, as depicted in FIG. 27.

It will be also be appreciated that gravure printing of microelectrodes according to the invention is advantageously amenable to scale-up via web processing, i.e. by feeding a continuous web of flexible porous film from a feed roll, via the printing station, and onward for further processing and/or onto a rewind roll.

Reducing the Electrodes

In the method of the invention, either a capacitive electrode material or a precursor thereof may be applied to the first surface to form the electrodes, and optionally also the linkages between electrode pairs and the electrical contacts. As used herein, a precursor of a capacitive electrode material is a substance that may be transformed into a conductive, capacitive electrode material on the porous film substrate by an appropriate chemical transformation. Therefore, where a precursor is applied to the porous film surface, for example by printing an ink comprising the precursor onto the surface, the method of the invention includes a step of transforming the precursor material on the porous film surface into a capacitive electrode material.

In a preferred embodiment, the precursor material is reduced to form the capacitive electrode material. The precursor may be reduced by any suitable reduction technique, including chemical, thermal, photo-thermal or beam methods. Suitable reduction methods to produce a variety of capacitive electrode materials from their precursors have been reported and are available to the skilled person.

Graphene oxide is a particularly preferred capacitive electrode material precursor, since it is considered to be more easily dispersed in aqueous-based inks than reduced high surface area carbon materials such as graphene. Accordingly, the separated electrodes of the invention may be printed using a graphene oxide-based ink, and the printed graphene oxide subsequently reduced in the printed electrodes to form reduced graphene oxide. Reduced graphene oxide has a high surface area and suitable electrical conductivity for use in capacitive energy storage devices according to the present invention. Graphene oxide may be reduced on the surface of the porous film by methods including chemical, photo-thermal and beam reduction techniques. For example, graphene oxide printed electrodes may be reduced by exposure to a chemical reductant such as hydrazine or hydroiodic acid.

Infiltrating the Film with Electrolyte

In the method of the invention, the porous film is infiltrated with an electrolyte. In preferred embodiments, the porous film is infiltrated with the electrolyte after applying the capacitive electrode material or precursor to form the electrodes on the porous film. However, it is not excluded that electrodes may be formed on a porous film already infiltrated with an electrolyte, or one or more components or precursors thereof.

The electrolyte is at least partly infiltrated into the internal porosity of the porous film or films. As such, it is generally preferred that a low viscosity, liquid electrolyte or precursor mixture is infiltrated into the porous film, thereby allowing permeation into the film interior. Liquid phase electrolytes, such as ionic liquid electrolytes or organic solvent-based electrolytes, may thus be infiltrated directly into the porous films, for example by applying the electrolyte to the porous film surface. Where a gel electrolyte is preferred, a low viscosity electrolyte precursor may be used to effect the infiltration into the internal porosity of the film, and the precursor is subsequently gelled to produce the electrolyte. The low viscosity electrolyte precursor may comprise a cross-linkable polymer, such as polyvinyl alcohol, in an aqueous mixture also containing the electrolyte ions. The gel electrolyte is then produced by cross-linking the polymer.

Exemplary Embodiments

FIG. 1 schematically depicts prior art supercapacitor 100, comprising metallic current collector foils 101 and 102 which are connected to an external circuit. Current collector foils 101 and 102 are coated with high surface-area, conductive carbon electrodes 103 and 104. Interposed porous separator 105 provides electrical insulation between the electrodes, while electrolyte 106, which saturates separator 105 and electrodes 103 and 104, provides ionic communication between the electrodes during charging and discharging. The separation distance (marked $d_s$ in FIG. 1) between the electrodes is greater than the thickness of the separator, and is thus typically greater than 50 microns. Furthermore, the electrodes are only accessible from a single direction during charging and discharging of the device, i.e. via ionic conductivity pathways extending directly between electrodes 103 and 104 through separator 106 (indicated by arrow 106). In addition, the relative large size of electrodes 103 and 104 necessitates the use of current collector foils 101 and 102 to avoid unacceptable internal electrode resistances.

Figure 2:
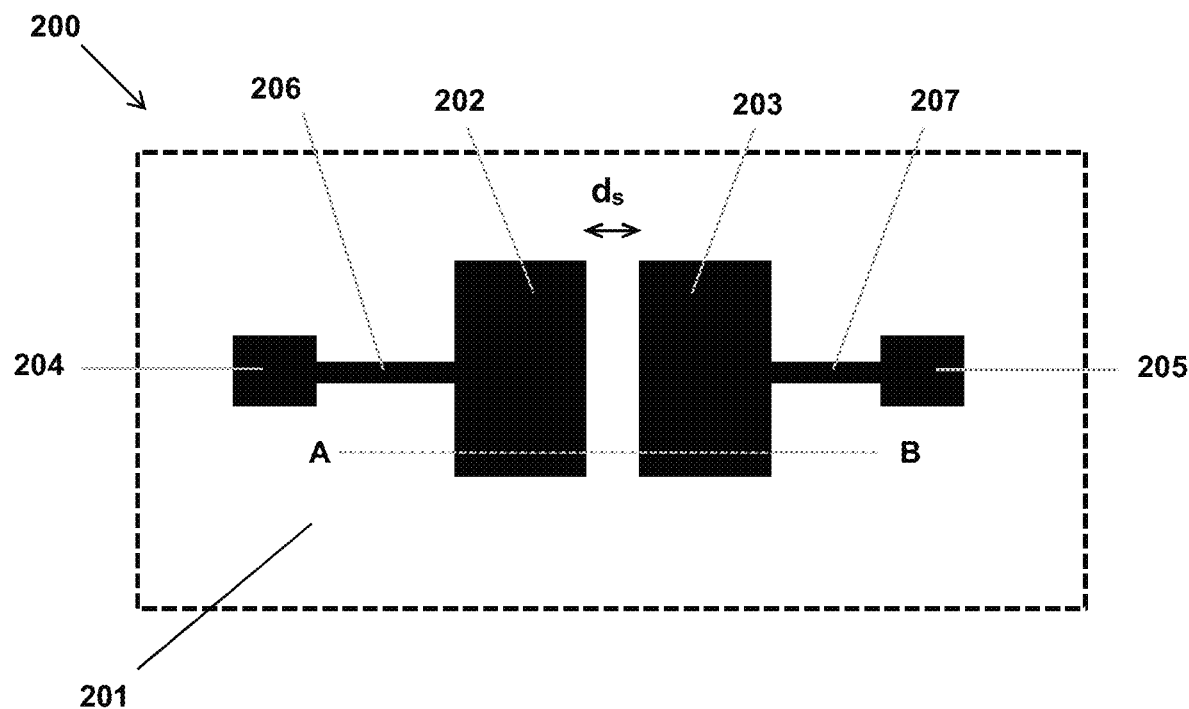
FIG. 2 is a schematic drawing in plan view of a pair of separated electrodes printed onto a porous film, according to an embodiment of the invention.

An embodiment of the invention will now be described with specific reference to FIGS. 2 to 4. FIG. 2 schematically depicts in plan view a cut-out section of capacitive energy storage device 200, comprising porous PVDF film 201 and a pair of separated electrodes 202 and 203. Electrodes 202 and 203 are rectangular in shape and have a separation distance (marked $d_s$ in FIG. 2) of less than 30 microns. Electrodes 202 and 203 are connected to electrical contact pads 204 and 205 via linkages 206 and 207 respectively, the contact pads being available for electrical connection to an external circuit, for example via an attached wire. The electrodes, linkages and contact pads comprise reduced graphene oxide, produced by printing an ink comprising graphene oxide onto porous film 201 and then chemically reducing the graphene oxide, as will be described in greater detail hereafter.

Figure 3:
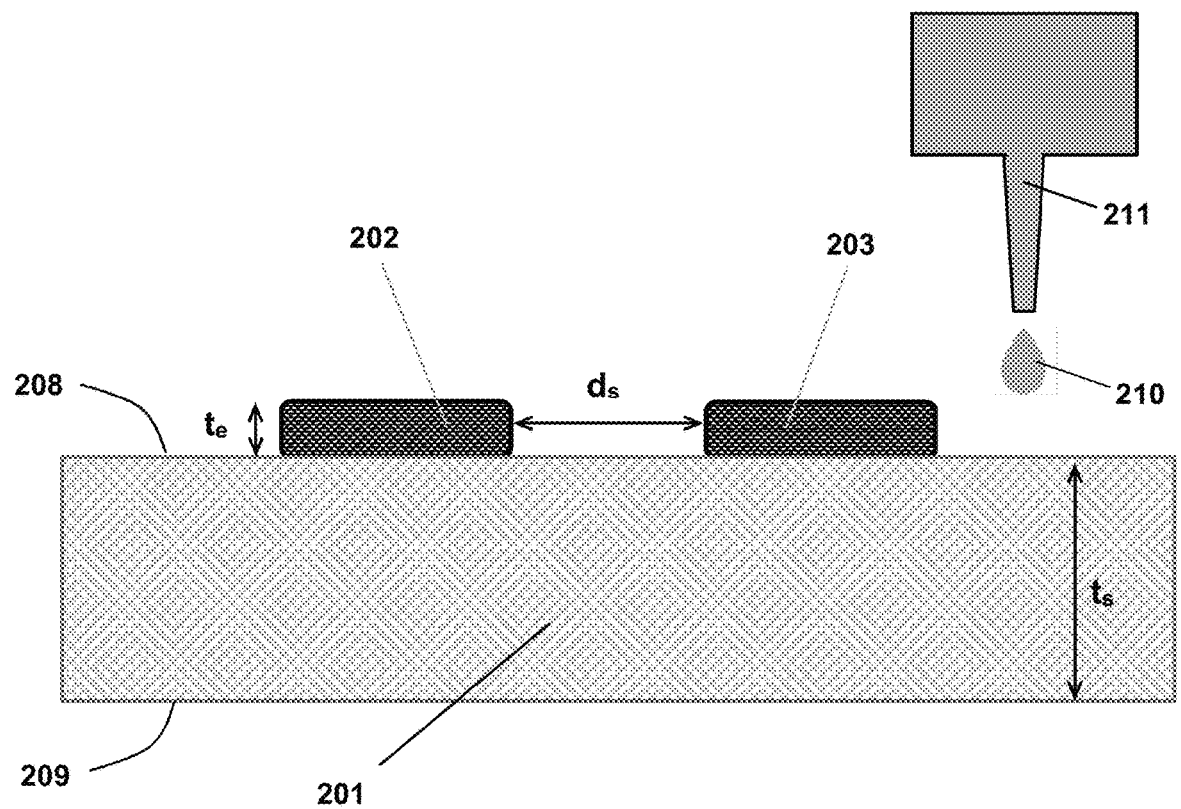
FIG. 3 depicts in side cutaway view the porous film and printed electrodes of FIG. 2, taken through section line A-B indicated in FIG. 2.
Figure 4:
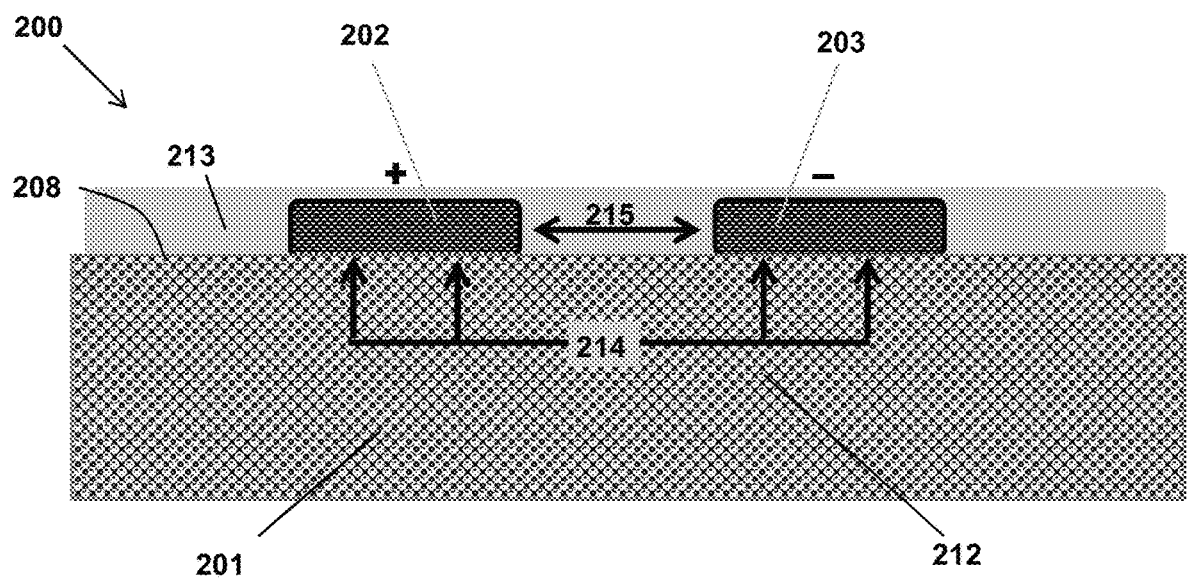
FIG. 4 is a schematic drawing in side cutaway view of a single-layer capacitive energy storage device according to an embodiment of the invention, produced by infiltrating the porous film of FIG. 3 with an electrolyte.

FIG. 3 schematically depicts in side view capacitive energy storage device 200, taken through section line A-B indicated in FIG. 2. Porous film 201 has first surface 208 and reverse surface 209, and has a thickness (marked $t_s$ in FIG. 3) of approximately 50 microns. Electrodes 202 and 203 are disposed directly on top of first surface 208, without an intervening metallic current collector layer, and have an out-of-plane thickness (marked $t_e$) of approximately 50 nm. As depicted in FIGS. 3 and 4, polyvinyl alcohol/KOH electrolyte 210 is applied to porous film 201 as a low viscosity aqueous mixture from dispenser 211, thereby filling the internal porosity 212 of porous film 201 and optionally also forming layer 213 overlying first surface of porous film. Electrolyte 210 is then gelled by a thermal treatment to provide a gel electrolyte in the internal porosity of film 201 and in layer 213.

The high surface area reduced graphene oxide of electrodes 202 and 203 is in direct contact with, and thus in ionic communication with, the underlying portions of first surface 208 of porous film 201. In use, when a potential is applied across separated electrodes 202 and 203 to charge the energy storage device, or when the device is discharged via an external circuit, the electrolyte in the internal porosity provides pathways for ionic communication between the electrodes, as depicted by arrows 214 in FIG. 4. Optionally, supplementary pathways for ionic communication are also provided above first surface 2018 through layer 213, as depicted by arrow 215. However, internal porosity 212 acts as the primary reservoir for electrolyte 210, and in particular provides ionic transportation pathways between the capacitive reduced graphene oxide material of electrodes 202 and 203 via multiple directions.

Figure 5:
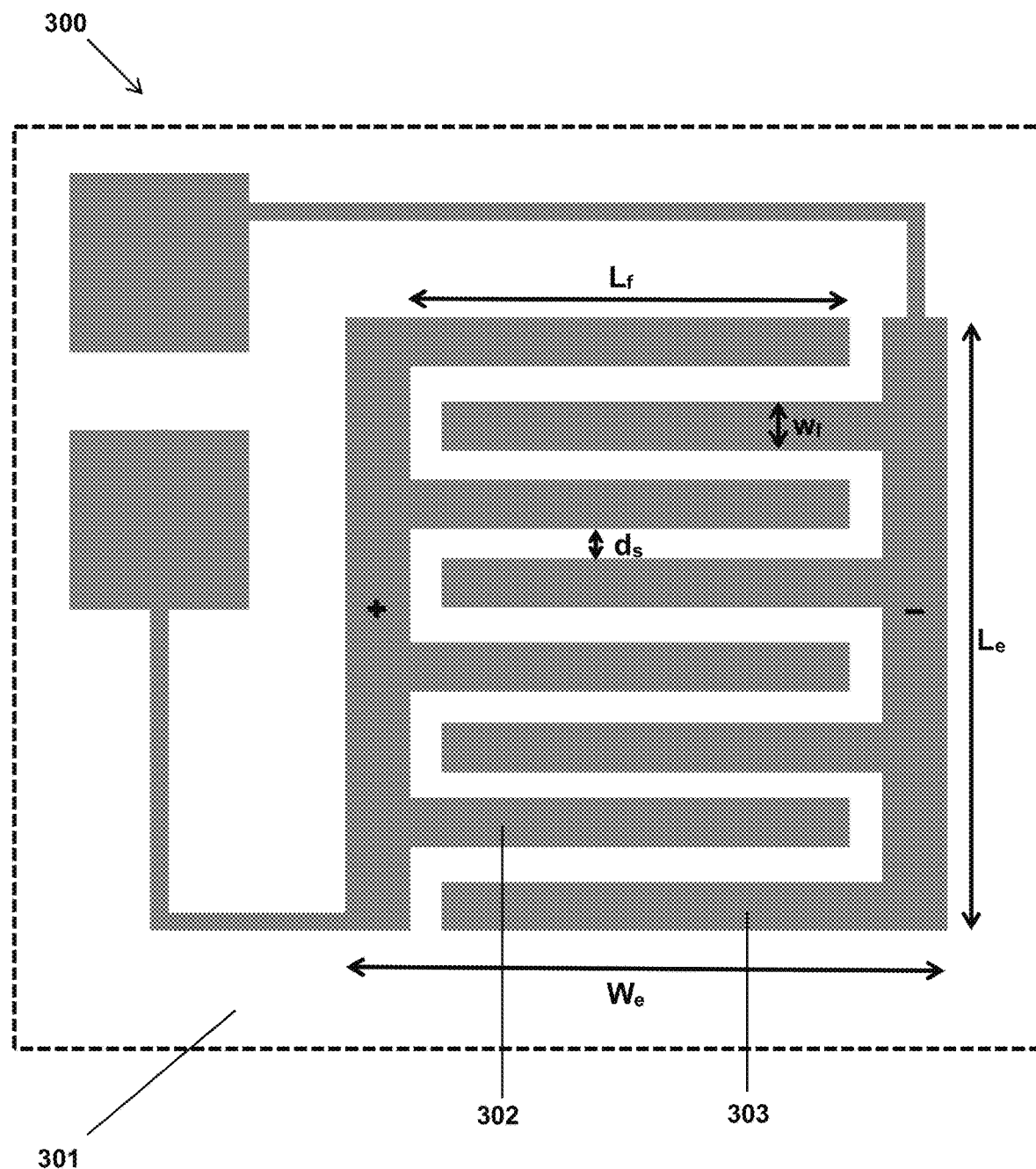
FIG. 5 is a schematic drawing in plan view of a single-layer capacitive energy storage device, comprising interdigitated separated electrodes, according to an embodiment of the invention.

Another embodiment of the invention will now be described with reference to FIG. 5, which schematically depicts in plan view a cut-out section of capacitive energy storage device 300, comprising porous PVDF film 301 infiltrated with an electrolyte (not shown) and a pair of separated electrodes 302 and 303. Electrodes 302 and 303 comprise reduced graphene oxide, printed as graphene oxide directly onto the porous film surface and chemically reduced thereon. The electrodes together form a pair of interdigitated electrodes, each electrode having four fingers. The fingers have a width (marked $w_f$ in FIG. 5) of 100 microns and a length (marked $L_f$ in FIG. 5) of 900 microns. The separation distance (marked $d_s$ in FIG. 5) between the electrodes, i.e. the shortest distance between adjacent fingers, is approximately 30-50 microns. The pair of separated electrodes 302 and 303, including the electrodes themselves and the interelectrode separation area, covers a surface area on the porous film of less than about 1 mm$^2$, calculated as the product of the electrode pair width and the electrode pair length (marked $w_e$ and $L_e$ in FIG. 5, respectively).

Figure 6:
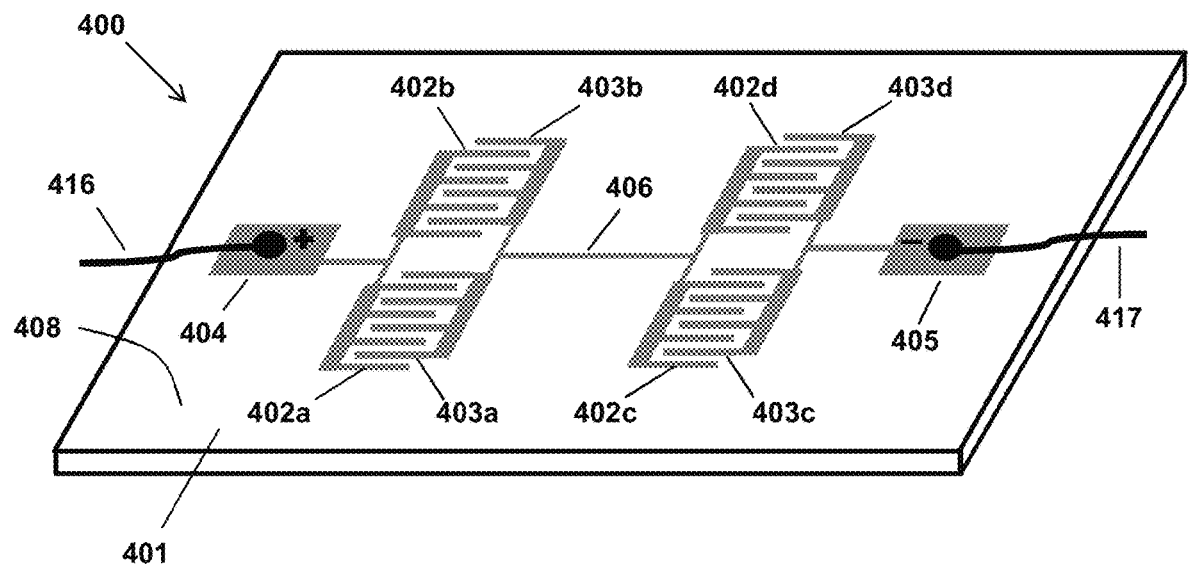
FIG. 6 is a schematic drawing in perspective view of a single-layer capacitive energy storage device, comprising multiple pairs of interdigitated electrodes connected in parallel and series, according to an embodiment of the invention.

Another embodiment of the invention will now be described with reference to FIG. 6, which depicts capacitive energy storage device 400. Multiple pairs of separated electrodes 402 and 403 (shown as 402*a*/403*a* to 402*d*/403*d* in FIG. 6) are disposed on first surface 408 of porous PVDF film 401. Film 401 is infiltrated with an electrolyte (not shown). Electrodes 402 and 403 comprise reduced graphene oxide, printed as graphene oxide directly onto the porous film surface and chemically reduced thereon, and which is in ionic communication with surface 408.

Capacitive energy storage device 400 comprises electrode pairs in parallel (i.e. 402*a*/403*a* in parallel with 402*b*/403*b*, and 402c/403c in parallel with 402d/403d). Furthermore, capacitive energy storage device 400 comprises electrode pairs connected in series (i.e. 402a/403a combined with 402b/403b is connected in series with 402c/403c combined with 402d/403d). The array of multiple electrode pairs is electrically connected by conductive linkages 406 of printed reduced graphene oxide on first surface 408 of porous film 401. The array of electrically connected electrode pairs is also provided with electrical contact pads 404 and 405, also composed of printed and reduced graphene oxide. The array of electrodes is electrically connectable to an external circuit via wires 416 and 417, which are attached to contact pads 404 and 405, respectively.

Although capacitive energy storage device 400 is depicted with two blocks of two parallel-connected electrode pairs, connected in series, it will be appreciated that a wide variety of electrode configurations may be similarly provided in accordance with the invention.

Figure 7:
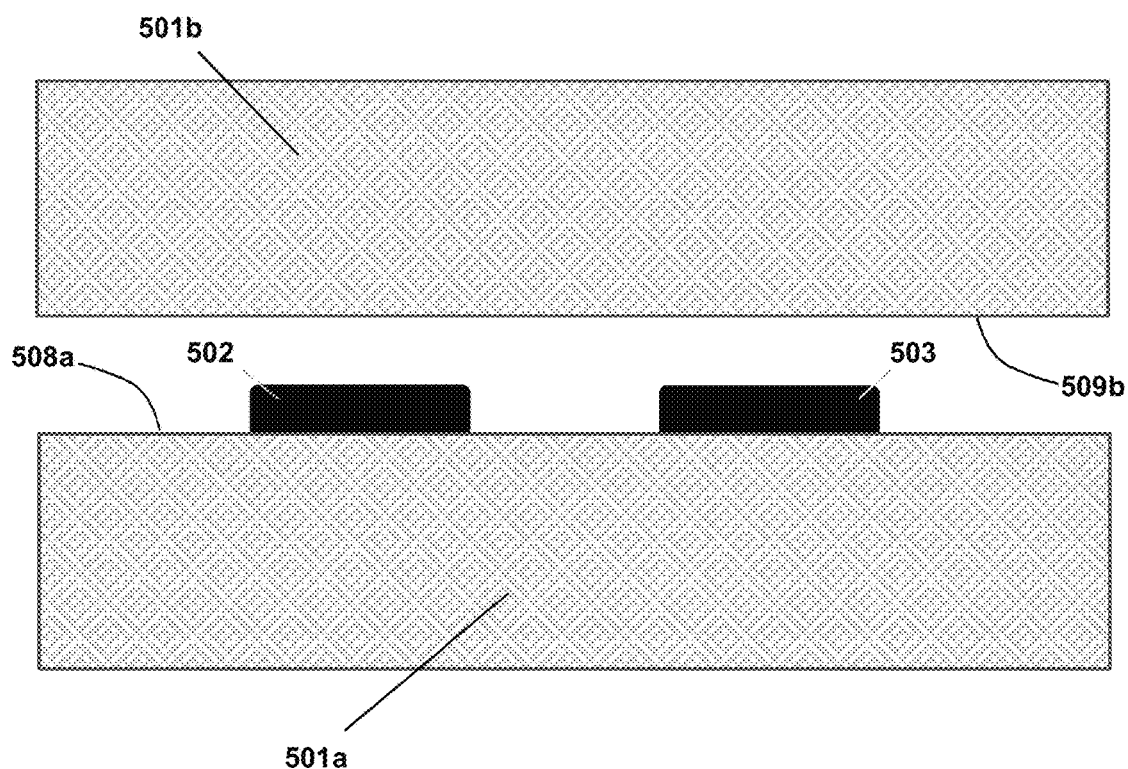
FIG. 7 is a schematic drawing in side cutaway view of two porous films positioned for stacking, the lower film having a pair of separated electrodes printed onto the porous film surface, according to an embodiment of the invention.
Figure 8:
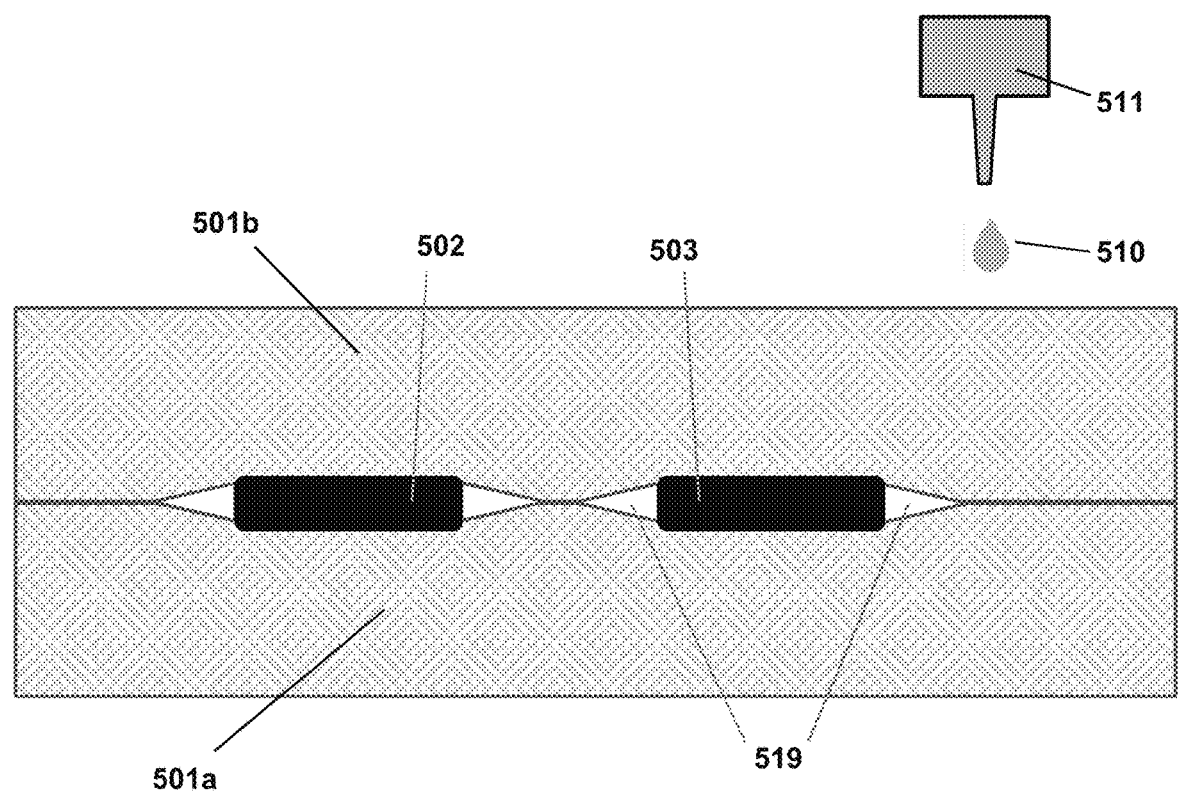
FIG. 8 depicts in side cutaway view the porous films of FIG. 7, stacked such that the separated electrodes are sandwiched between the films.

Another embodiment of the invention will now be described with reference to FIGS. 7 to 9. Figure schematically 7 depicts in side view first porous PVDF film 501a, having a pair of separated electrodes 502 and 503 disposed directly on top of first surface 508a. Electrodes 502 and 503 are connectable to an external circuit via contact pads with attached wires (not shown). As depicted in FIGS. 7 and 8, second porous PVDF film 501b is then stacked on top of first porous film 501a such that electrodes 502 and 503 are in abutting engagement with reverse surface 509b of second porous film 501b. Since both the first and second porous films are flexible membranes, films 501a and 501b conform closely around electrodes 502 and 503, such that surfaces 508a and 509b are in contact and leave at most small gaps 519 surrounding the electrodes.

Figure 9:
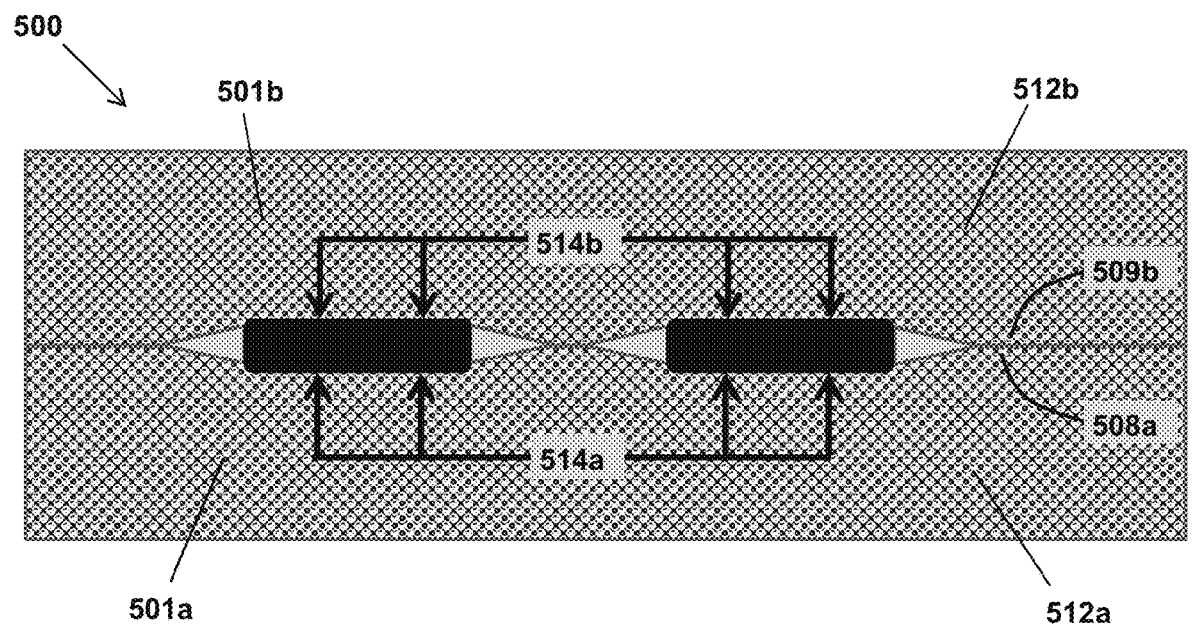
FIG. 9 is a schematic drawing in side cutaway view of a double-layer stacked capacitive energy storage device according to an embodiment of the invention, produced by infiltrating the porous films of FIG. 8 with an electrolyte.

As depicted in FIGS. 8 and 9, polyvinyl alcohol/KOH electrolyte 510 is then applied to stacked porous films 501a and 501b as a low viscosity aqueous mixture from dispenser 511, thereby filling internal porosity 512a of porous film 501a and internal porosity 512b of porous film 201b (and gaps 519, if present). Electrolyte 210 is then gelled by a thermal treatment to provide a gel electrolyte in the internal porosity of both films 501a and 501b. Stacked capacitive energy storage device 500 is thus depicted in FIG. 9.

The high surface area reduced graphene oxide of electrodes 502 and 503 is in direct contact with, and thus in ionic communication with, first surface 208a of porous film 501a and reverse surface 509b of second porous film 501b. In use, when a potential is applied across separated electrodes 502 and 503 to charge the energy storage device, or when the device is discharged via an external circuit, the electrolyte in the internal porosity of both films provides pathways for ionic communication between the electrodes, as depicted by arrows 514a and 514b in FIG. 9. Electrodes 502 and 503 are effectively surrounded on all sides by a reservoir of electrolyte contained substantially entirely within the internal porosity of first and second porous films 501a and 501b, thereby providing ionic transportation pathways between the capacitive reduced graphene oxide material of electrodes 502 and 503 via multiple directions while avoiding dead volume in the device occupied by layers of electrolyte.

Figure 10:
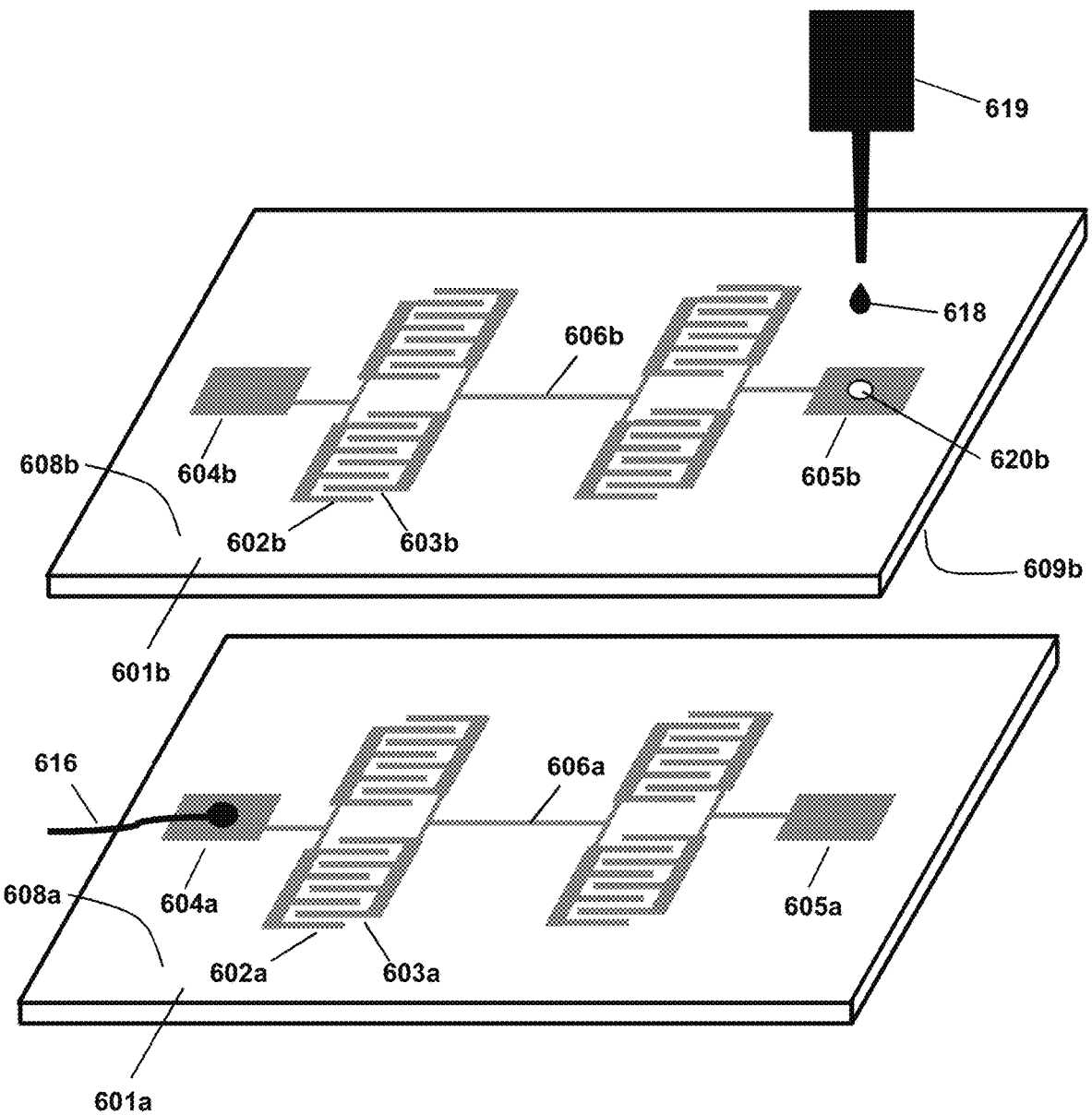
FIG. 10 is a schematic drawing in perspective view of two porous films positioned for stacking, both films comprising multiple pairs of interdigitated electrodes connected in parallel and series, wherein a conductive epoxy is being dispensed to produce an electrical connection between the electrode arrays on the two films, according to an embodiment of the invention.

Another embodiment of the invention will now be described with reference to FIGS. 10 to 14. FIG. 10 depicts first and second porous PVDF films 601a and 601b, each of which has multiple pairs of separated electrodes 602 and 603 (including 602a/603a and 602b/603b, respectively) disposed on first surfaces 608a and 608b. Electrodes 602 and 603 comprise reduced graphene oxide, and are connected via conductive linkages 606a and 606b and provided with electrical contact pads 604a and 605a, and 604b and 605b, respectively, as described herein with reference to FIG. 6. Contact pad 604a is electrically connectable to an external circuit via attached wire 616.

Figure 11:
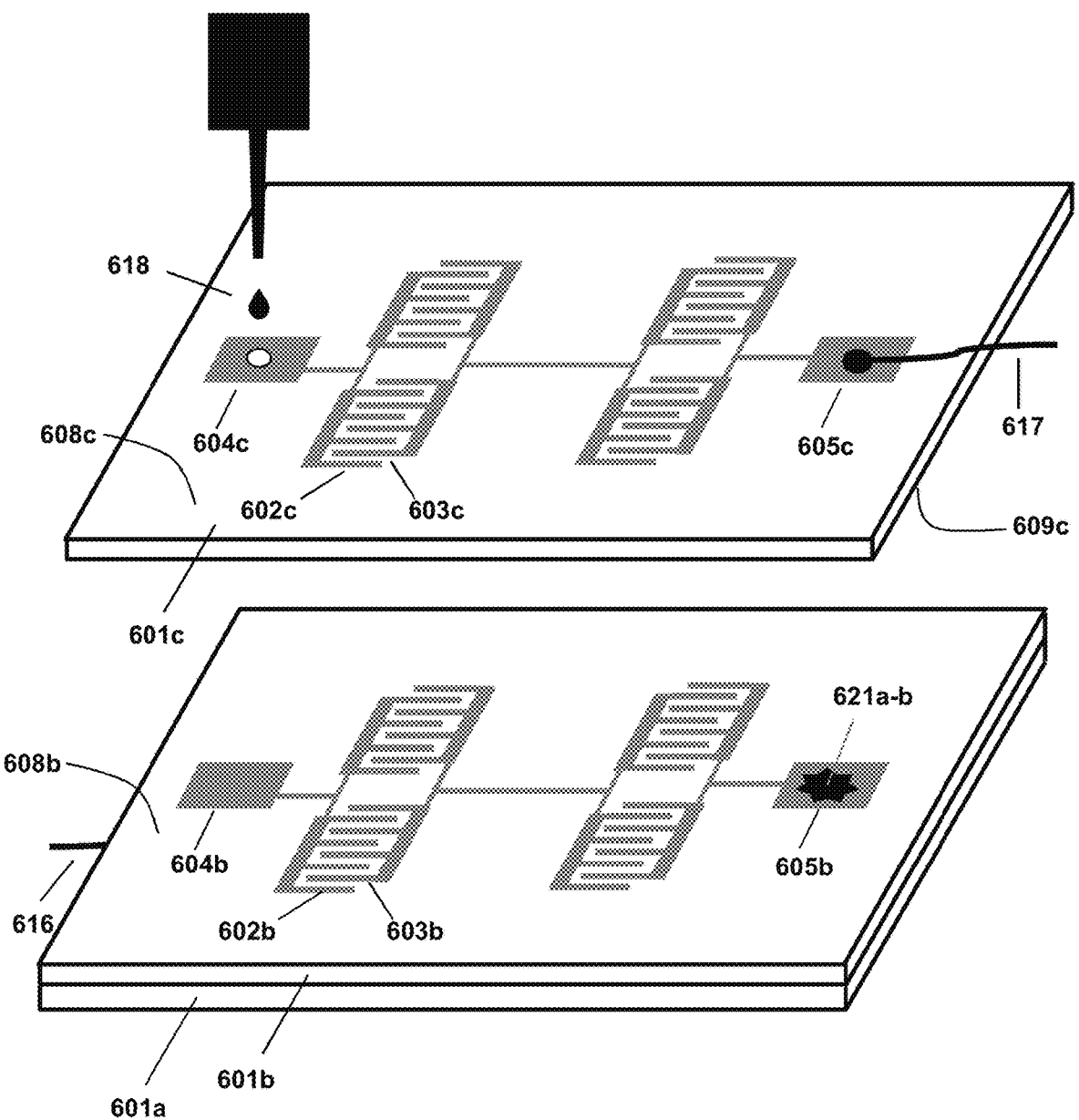
FIG. 11 depicts in perspective view the porous films of FIG. 10, stacked such that the separated electrodes of the lower film are sandwiched between the porous film surfaces and with the electrode arrays on the two films electrically connected via a conductive epoxy electrical connection, and further depicts a third porous film positioned for stacking on top of the first and second porous films, according to an embodiment of the invention.

As depicted in FIGS. 10 and 11, second porous PVDF film 601b is stacked on top of first porous film 601a such that electrodes 602a and 603a are in abutting engagement with reverse surface 609b of second porous film 601b, as described in more detail herein with reference to FIG. 8. The films are stacked such that contact pad 605b is in vertical alignment with contact pad 605a. Conductive, silver particle-filled epoxy resin 618, dispensed from dispenser 619, is then placed into opening 620b and onto adjacent areas of contact pad 605b. Opening 620b is a hole which passes through contact pad 605b and the entire thickness of second porous film 601b. With the films stacked on top of each other, conductive epoxy 618 penetrates through opening 620b and contacts contact pad 605a on first porous film 601a. Epoxy 618 is then cured to create a permanent electrical connection 621a-b between contact pads 605a and 605b, and also to permanently adhere porous films 601a and 601b together.

It will be appreciated that opening 620b may be formed either before or after printing contact pad 605b on first surface 608b, and may also be formed either before or after stacking porous film 601b on top of porous film 601a. Equally, it will be appreciated that opening 620b need not necessarily pass directly through contact pad 605b, but may, for example, be positioned adjacent to it such that epoxy 618 spreads over surface 608b onto contact pad 605b when applied. Moreover, contact pads 605b and 605a need not be of identical sizes or in perfect vertical alignment. The skilled person will appreciate that contact pads 605a and 605b, and opening 620b may be configured in different ways provided that a suitable electrical connection between the contact pads may be provided.

Other means of electrically connecting contact pads 605a and 605b, not relying on an opening formed in the films, are also considered to fall within the invention. For example, a conductive material of sufficiently low viscosity may be applied to first surface 608b on and/or adjacent to contact pad 605b, and allowed to permeate through the internal porosity of porous film 601b into contact with contact pad 605a to produce an electrical connection. As another alternative, an electrical connection may be provided via a metallic wire or clip extending around the edge of porous film 601b.

Figure 12:
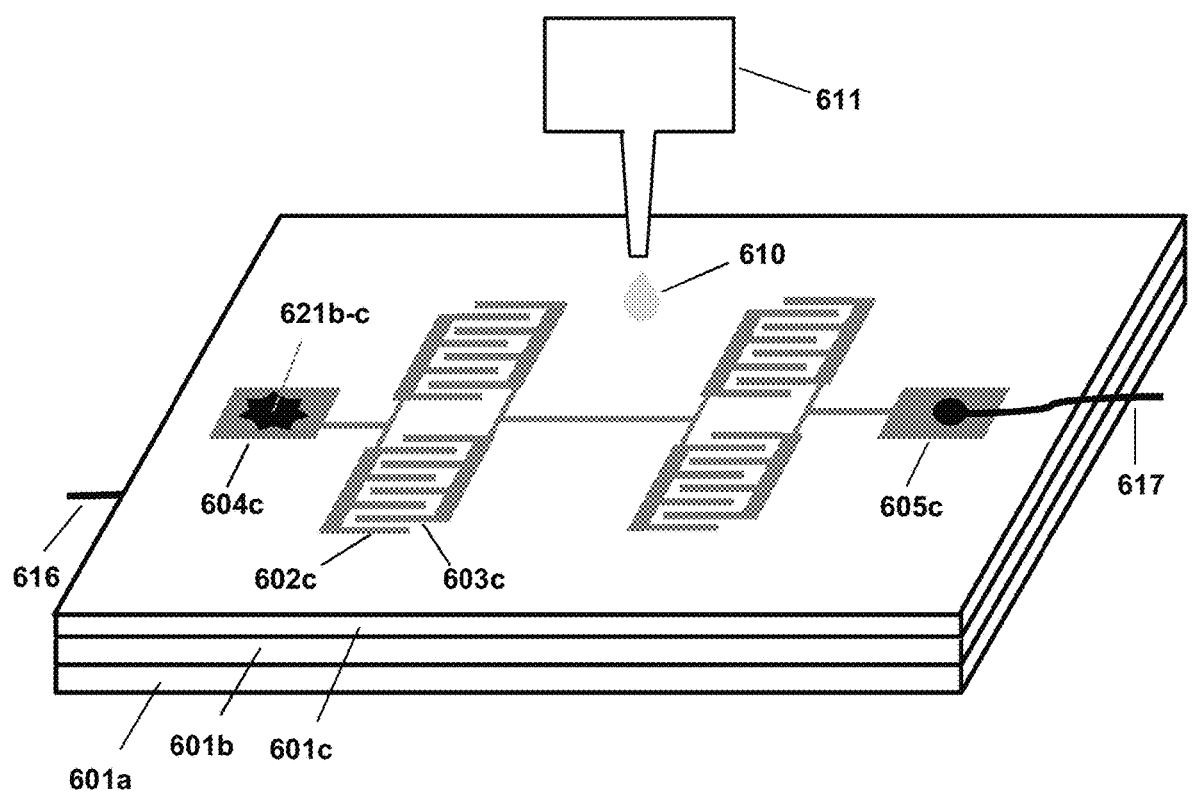
FIG. 12 depicts in perspective view the three porous films of FIG. 11, stacked such that the separated electrodes of the lower two films are sandwiched between the porous film surfaces and with the electrode arrays on the three films electrically connected via conductive epoxy electrical connections, according to an embodiment of the invention.

As depicted in FIGS. 11 and 12, a third porous PVDF film 601c, having multiple pairs of electrodes, including 602c/603c, disposed on first surface 608c, is then stacked on top of second porous film 601b such that electrodes 602b and 603b are in abutting engagement with reverse surface 609c of third porous film 601c. An electrical connection 621b-c between contact pads 604c and 604b is then created by penetrating conductive epoxy resin 618 through opening 620c. Contact pad 605c is electrically connectable to an external circuit via attached wire 617.

Figure 13:
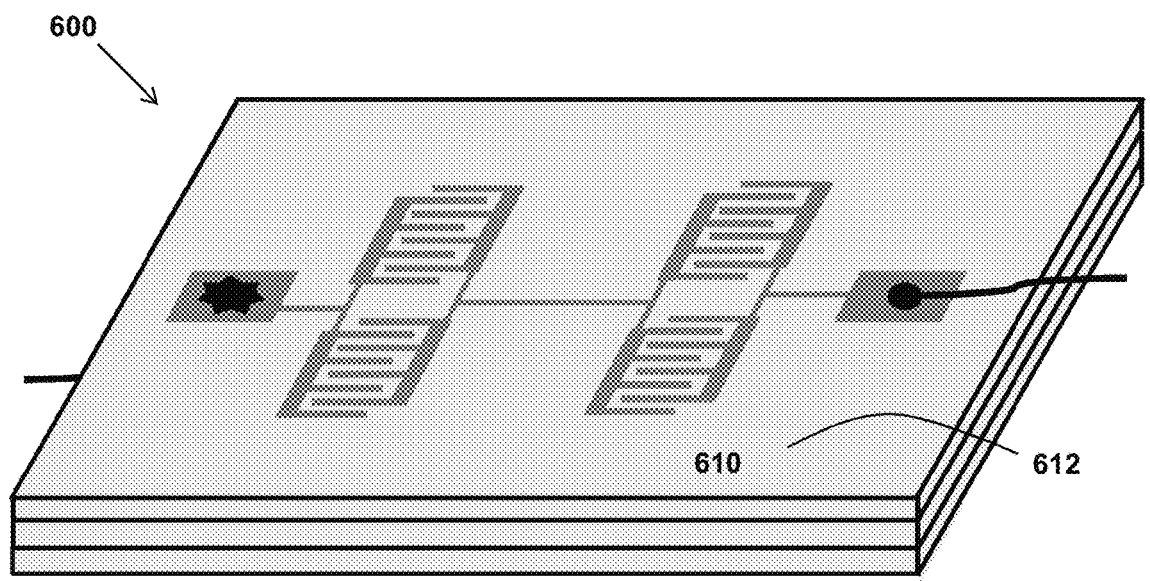
FIG. 13 is a schematic drawing in perspective view of a multi-layer stacked capacitive energy storage device, comprising an array of electrically connected electrodes pairs connected in parallel and series across the thickness of the stack, according to an embodiment of the invention.

As depicted in FIGS. 12 and 13, polyvinyl alcohol/KOH electrolyte 610 is then applied to stacked porous films 601a, 601b and 601c as a low viscosity aqueous mixture from dispenser 611, thereby infiltrating the entire stack, including the internal porosity 612 of all three porous films. Electrolyte 610 is then gelled by a thermal treatment to provide a gel electrolyte in the internal porosity of films 601a, 601b and 601c. Stacked capacitive energy storage device 600 is thus depicted in FIG. 13.

Figure 14:
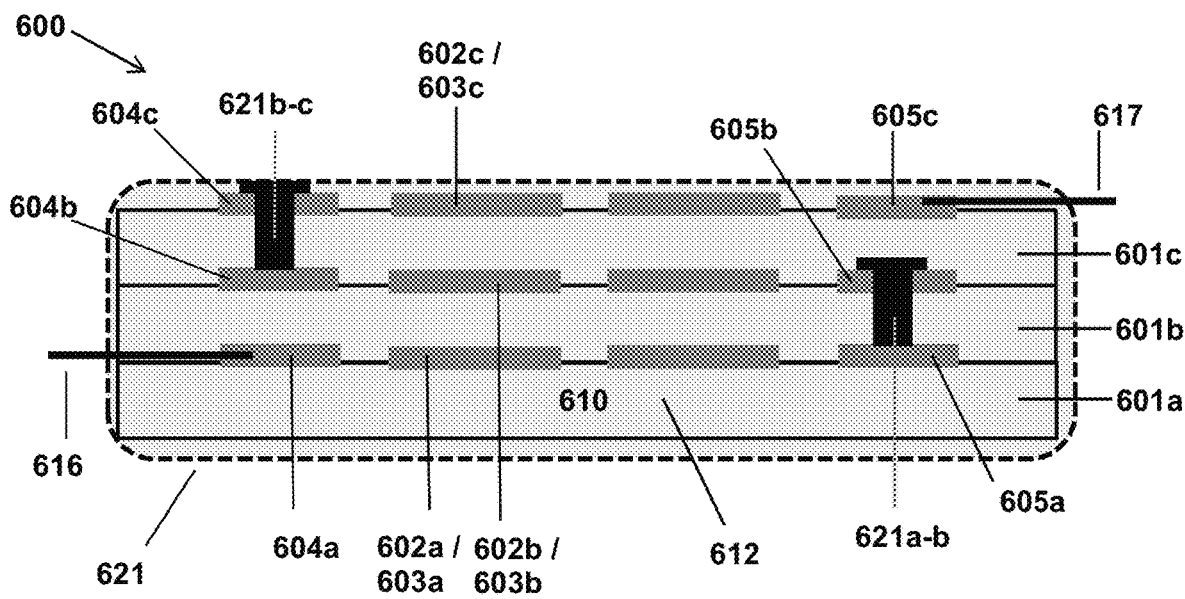
FIG. 14 is a side transparent view of the multi-layer stacked capacitive energy storage device of FIG. 13.

FIG. 14 depicts a side transparent view of capacitive energy storage device 600, including stacked porous films 601a, 601b and 601c, electrode pairs 602 and 603 on each film, where electrode pairs 602a/603a and 602b/603b are sandwiched between films 601a and 601b, and films 601b and 601c, respectively. Cured conductive epoxy electrical connection 621a-b penetrates through the thickness of film 601b, thus electrically connecting contact pads 605b and 605a as described herein. Similarly, electrical connection 621b-c prnetrates through the thickness of film 601c, thus electrically connecting contact pads 604c and 604b. Gelled electrolyte 610 is infiltrated through the entire stack, and is primarily located in the internal porosity 612 of each of porous films 601a, 601b and 601c. The entire electrochemical storage device is isolated within Kapton polyimide pouch 621, with only wires 616 and 617 protruding for connection to an external circuit. Notably, entire stacked device 600 is flexible, owing to its construction from multiple layers of flexible polymeric membranes, and encasement in a flexible pouch.

The high surface area reduced graphene oxide of paired electrodes 602a/603a is sandwiched between, and thus in ionic communication with, both porous films 601a and 601b, while the reduced graphene oxide of paired electrodes 602b/603b is sandwiched between, and thus in ionic communication with, both porous films 601b and 601c. In use, when a potential is applied across the connected array of electrodes pairs extending across all three layers of the stack to charge device 600, or when device 600 is discharged through an external circuit (via wires 616 and 617), the electrolyte in the internal porosity of the porous films provides pathways for ionic communication between the pairs of electrodes.

Although FIGS. 13 and 14 depict stacked capacitive energy storage device 600 with three layers of porous film and electrodes, it will be appreciated that a multilayered stack comprising four, five or even more layers may be produced by the same methodology. Furthermore, while device 600 is depicted with only one electrical connection between adjacent layers, multilayered stacks may equally be designed with multiple electrical connections between electrodes in adjacent layers. For example, pairs of electrodes on adjacent layers may be connected in parallel by electrically connecting one electrode of each pair to a corresponding electrode on the adjacent layer.

EXAMPLES

The present invention is described with reference to the following examples. It is to be understood that the examples are illustrative of and not limiting to the invention described herein.

Materials

Large flake natural graphite was obtained from Strategic Energy Resources Pty Ltd. Potassium hydroxide (KOH), poly vinyl alcohol (PVA), acetonitrile, hydroiodic acid, acetic acid, sulfuric acid, potassium persulfate, phosphorus pentoxide, potassium permanganate, ammonia ($NH_4OH$) and hydrazine were purchased from Sigma Aldrich and were used without any further purification. Cross-linked polyacrylate copolymer based hydrogel beads, with a capacity to absorb water up to 90 times their weight, were obtained from Demi Co Ltd (China). Flexible and porous PVDF membranes (~50 microns thick, with a pore size of 0.2 microns) were purchased from mdi Technologies Pty Ltd (India). Non-porous cellulose acetate sheets (Nobo Universal transparency sheets) were obtained from an office supplies retailer. Electrically conductive epoxy was purchased from AgIC Inc, Japan. Kapton polyimide sheets were purchased from Dupont.

Example 1. Preparation of a Single Layer Capacitive Energy Storage Device

1a) Synthesis of graphene oxide

Graphene oxide (GO) was synthesized using modified Hummer's method. Large flake graphite, sulfuric acid, potassium persulfate, phosphorus pentoxide and potassium permanganate, were used for the synthesis. The synthesized GO was exfoliated by sonication (UP-100 Ultrasonic processor) in reverse osmosis-purified water for 1 hour, followed by centrifugation to remove the un-exfoliated crystals of GO.

1 b) Preparation of GO Ink

A dispersion of GO in water, with a 0.25 mg/ml GO concentration, was prepared as described above. To a 1 litre sample of the dispersion, 10 g of superabsorbent polymer (SAP) beads were added. After 1 hour, the saturated beads were separated from the remaining dispersion, washed with water and dried at 50° C. for reuse. The concentrated dispersion after removal of the beads had a volume of 10 ml, with a 30 mg/ml GO concentration. The viscosity of the ink was 25 Pa s.

1c) Gravure Printing of Graphene Oxide Microelectrodes

A gravure printer (Labratester 180 obtained from nsm Norbert Schlafli Maschinen, Switzerland) was used to print the GO ink onto a flexible porous polyvinylidene difluoride (PVDF) film. Printer plates were designed with interdigitated electrode patterns of various sizes, and comprising arrays of interconnected electrode patterns in various combinations of series and parallel configurations. The printer plates were etched with a laser, procured from Norbert Schlafli AG, Switzerland, to produce recesses configured according to the electrode design.

The GO ink was applied to the printer plate. The flexible PVDF film, wrapped around the application roller, was then brought into rolling contact with the planar printer plate to print the separated electrodes onto the surface of the PVDF film. The printed electrodes dried under ambient conditions within minutes.

Figure 15:
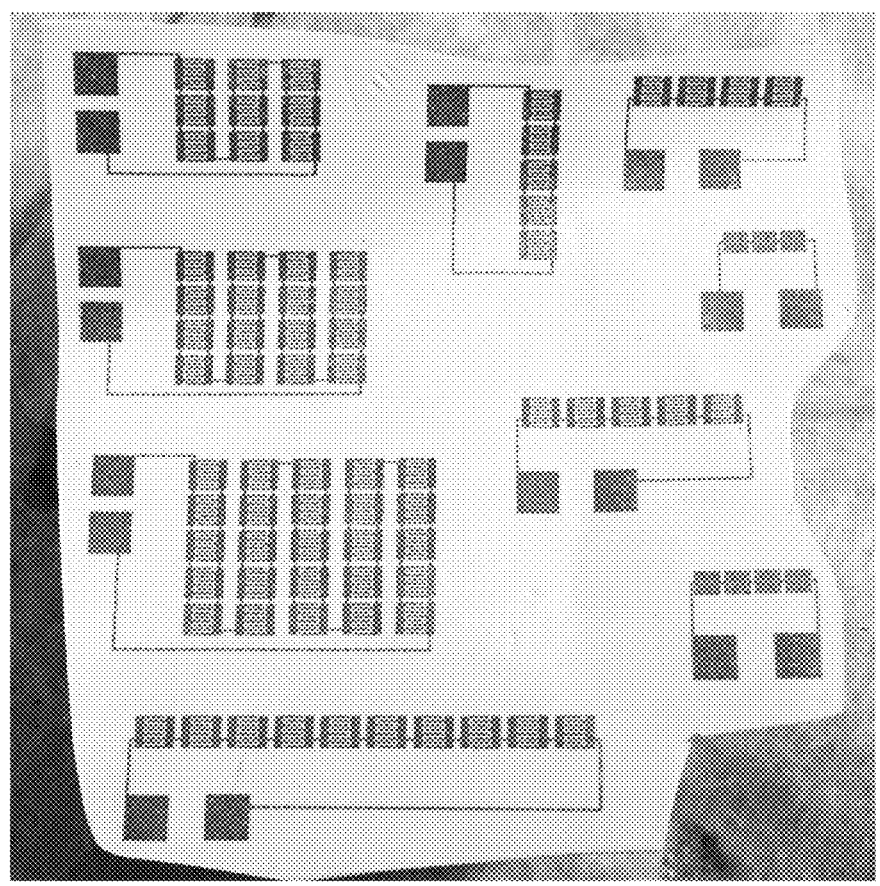
FIG. 15 is a representation of a printer plate design, used to produce printer plates for printing separated electrodes onto a porous film surface according to the method of Example 1.
Figure 16:
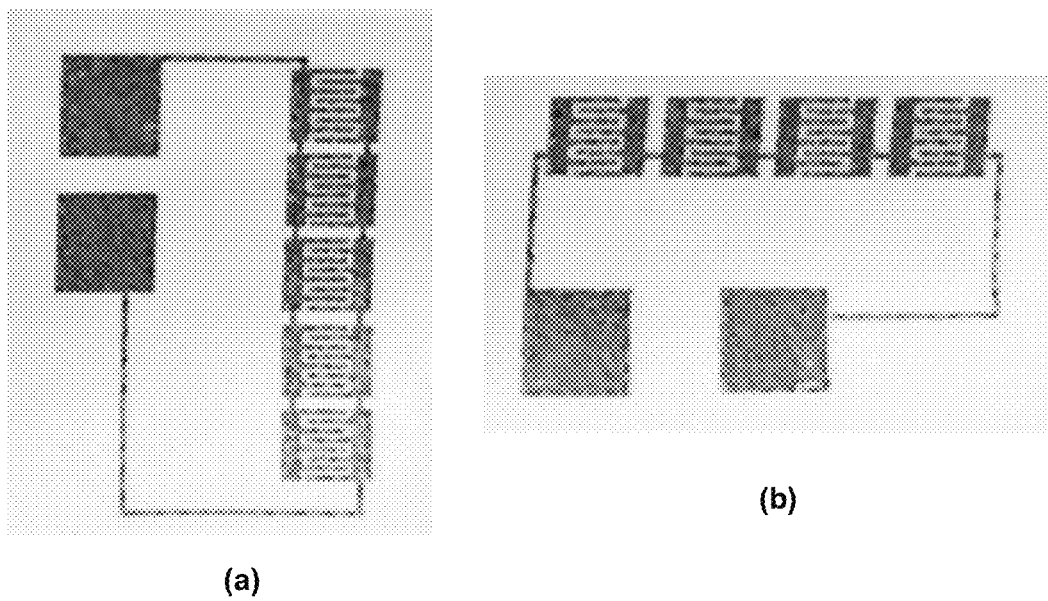
FIG. 16 is a photograph of a printer plate used for printing separated electrodes onto a porous film surface according to the method of Example 1.

An example of a porous PVDF film, having multiple pairs of separated, interdigitated GO electrodes disposed on top of the surface, is depicted in FIGS. 15 and 16. In FIG. 15, it may be seen that a wide variety of combinations of electrode pairs in series and/or in parallel were produced in the printing process, including multiple electrode pairs in parallel, multiple electrode pairs in series, and blocks of parallel-connected electrode pairs connected in series. The separated electrode pairs in the arrays are connected by linkages of graphene oxide on the surface of the PVDF film, and each connected array of separated electrode pairs also has two square graphene oxide contact pads.

In FIG. 16 (a), an enlarged view of an array of four pairs of interdigitated separated electrodes connected in parallel is seen, while in FIG. 16 (b), an enlarged view of an array of four pairs of interdigitated separated electrodes connected in series is seen. Each pair of electrodes has two interdigitated electrodes, each electrode having four fingers with a width of approximately 90 microns and a length of approximately 890 microns. The out-of-plane thickness of the electrodes was approximately 50 nm. The electrode separation distance, i.e. between the fingers of the interdigitated electrodes, is approximately 100 microns. Each pair of interdigitated electrodes including both the electrodes and the inter-electrode separation area, covers a surface area on the porous PVDF film surface of approximately 9 mm². The graphene oxide contact pads are 2 mm×2 mm squares, to facilitate electrical connection to an external circuit.

Figure 17:
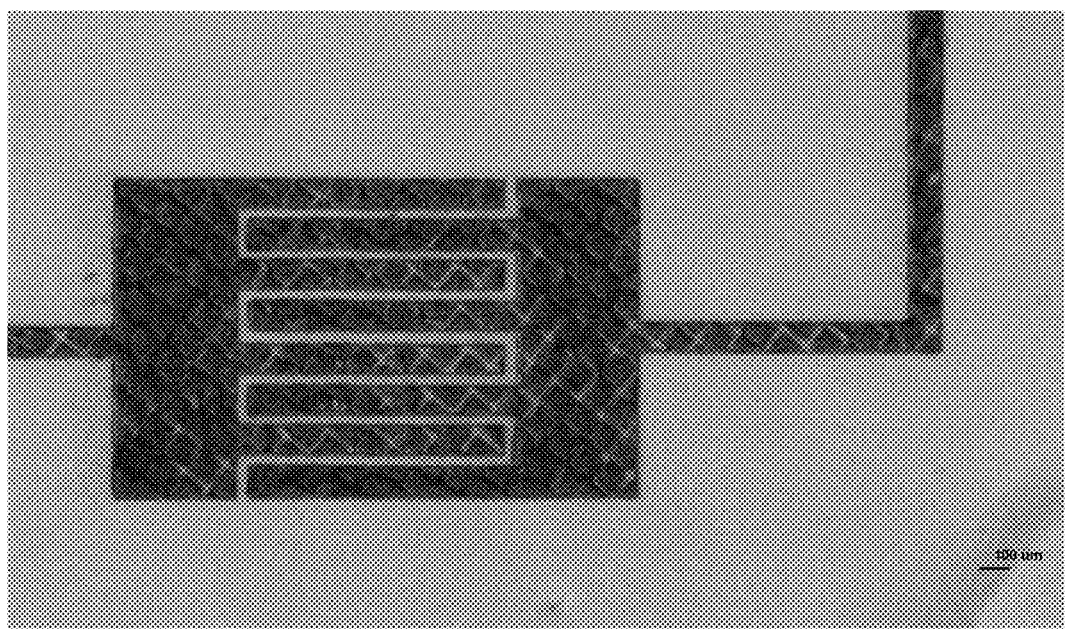
FIG. 17 is a photograph of a porous PVDF film with graphene oxide electrodes printed onto a surface thereof, produced according to the method of Example 1.

Printed electrode pairs with a variety of different dimensions were thus produced. Depicted in FIG. 17 is an optical microscope image of a printed interdigitated electrode pair on a PVDF film. The finger width of each electrode is approximately 100 microns, and the inter-electrode separation distance is approximately 40 microns. The electrode pair covers a surface area on the porous PVDF film surface of less than 2 mm².

Figure 18:
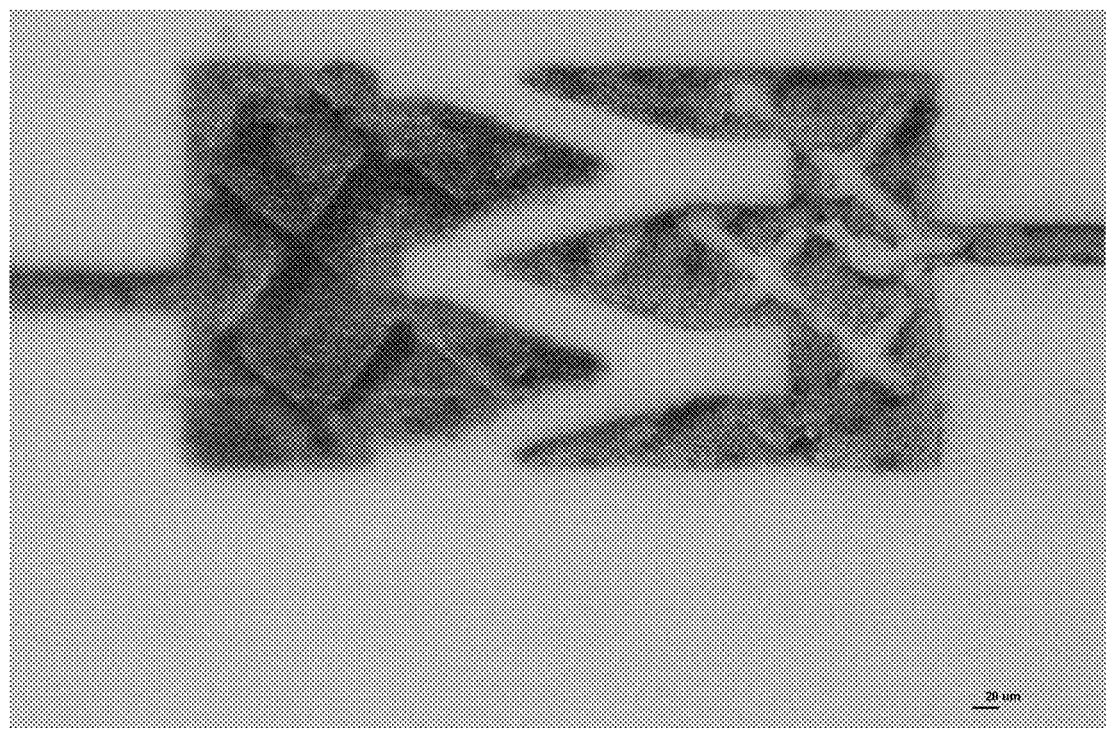
FIG. 18 is a pair of photographs depicting arrays of interdigitated electrodes connected (a) in parallel and (b) in series via linkages of graphene oxide, printed onto a surface of a porous PVDF film, according to the method of Example 1.

Depicted in FIG. 18 is an optical microscope image of a printed electrode pair on a PVDF film, the electrode having a zig-zag configuration. The inter-electrode separation distance is approximately 30 microns, while the electrode pair covers a surface area on the porous PVDF film surface of less than 0.25 mm². The printed electrical linkages connecting the electrodes to the electrical contact pads have a line width of approximately 30 microns. It is thus considered that, for example, interdigitated electrodes having finger widths of below about 30 microns and inter-electrode separation distances of below about 30 microns may be produced in accordance with this method.

The various differing arrays of electrode pair combinations, for example as depicted in FIG. 15, were produced on the substrate for investigative purposes, and it will be appreciated that in a commercial implementation the configuration of printed electrodes on the porous substrate would be produced according to the energy storage requirements of the device, and preferably with a view to minimising unutilised space on the film surface.

1d) Reduction of Microelectrodes

A number of chemical reduction methodologies were used to reduce the printed GO microelectrodes on the porous PVDF films, with the aim to maximise the conductivity and thereby to minimise resistance related losses in the printed supercapacitors.

In a first reduction procedure (hydrazine and ammonia solution reduction), a PVDF film comprising printed GO microelectrodes was immersed in a solution mixture of 0.15 ml of hydrazine (80 wt. %), 1.05 ml of NH$_4$OH (0.28 wt. %) and 300 ml of water, and was heated at 95° C. for 1 h under a water cooled condenser. After 1 h, the film was thoroughly washed with water and methanol and dried in a vacuum oven at 145° C. for 1 h.

In a second reduction procedure (hydrazine vapour reduction), a PVDF film comprising printed GO microelectrodes was placed on the wall of a 100 ml beaker using Kapton tapes. 1 ml of hydrazine (80 wt. %) was added to the beaker, which was subsequently covered with parafilm and heated at 100° C. for 16 h. Subsequently, the film was thoroughly washed with water and methanol and dried in a vacuum oven at 145° C. for 1 h.

In a third reduction procedure (thermal reduction), a PVDF film comprising printed GO microelectrodes was heated at 150° C. (below the 170° C. melting temperature of the PVDF substrate) for 6 h under vacuum.

In a fourth reduction procedure (hydrazine solution reduced), a PVDF film comprising printed GO microelectrodes was immersed in a solution mixture of 1 ml of hydrazine (80 wt. %) and 100 ml of water and heated at 100° C. for 24 h under a water cooled condenser. Subsequently, the film was thoroughly washed with water and methanol and dried in a vacuum oven at 145° C. for 1 h.

In a fifth reduction procedure (hydroiodic acid reduction), a PVDF film comprising printed GO microelectrodes were placed on the wall of a 300 ml beaker using Kapton tapes. 2 ml of hydroiodic acid (55 wt. %) and 5 ml of acetic acid was added to the beaker. The beaker was covered with parafilm and was heated at 40° C. for 16 h. Subsequently, the film was thoroughly washed with water and methanol and dried under ambient conditions.

Two point conductivity measurements were performed using an Agilent B2900 Series Precision Source/Measure Unit wired through an EmCal Genelyte Probe Station with 5 microns tipped tungsten probes. The probes were placed 1 mm apart on the 2 mm×2 mm contact pads of the electrodes. Measurements were taken by varying the applied voltage between 0 and 1 V. The scan rate used in the measurements was 0.8 V/s with a measurement taken every 0.008 V.

Figure 19:
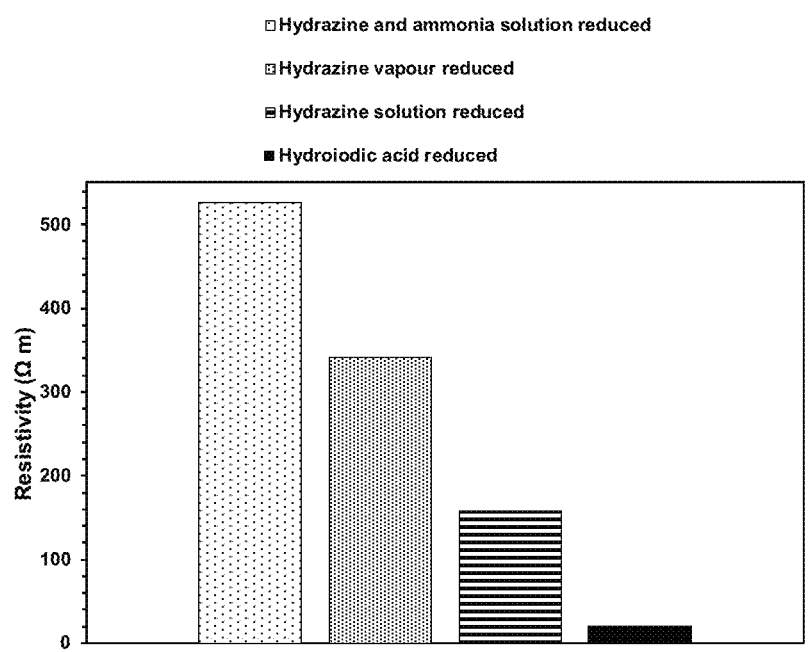
FIG. 19 is an optical microscope image of a printed interdigitated electrode pair on a PVDF film, produced according to the method of Example 1.

The highest resistivity was observed in the case of the thermally reduced printed GO (10 kΩm), which was similar to that of the as-printed GO. The resistivity of the printed graphene oxide, after reduction according to the other reduction procedures, is shown in FIG. 19. The lowest resistivity (approximately 20 Ωm) was observed in the case of the hydroiodic acid reduction, which was therefore used in the subsequent electrochemical characterisation studies.

A wide variety of electrode pair configurations on porous PVDF films were thus reduced. A clear colour change of the graphene oxide from brown (unreduced) to black (reduced) was evident in each case. The reduction process did not degrade the printed configuration of the electrodes.

1e) Cell Assembly and Electrolyte Infiltration

A thin line of wax (with a width generally in the range of 1-1.5 mm) was deposited between the electrode and the contact pads of the printed and reduced electrodes on the porous films. This locally penetrated and blocked the pores of the film before solidifying, thus isolating the contact pads from the electrolyte. An electrolyte mixture was prepared by adding polyvinyl alcohol (PVA, 1 g) to deionized (DI) water (10 ml), and the mixture was heated at 90° C. with constant stirring. Once the PVA/water solution became clear, KOH (10 ml of 6 M solution) was added dropwise until a homogeneous solution was achieved. Subsequently, the electrolyte mixture was cooled to room temperature. The porous film was then infiltrated with the low viscosity PVA/KOH electrolyte mixture, which had a viscosity qualitatively similar to glycerine, thus estimated as about 1 Pa s. Infiltration was conducted by drop-casting the electrolyte onto the porous film to saturation; the uncured electrolyte mixture was visibly absorbed into the film until a visible electrolyte layer formed on the surface. Once the film was infiltrated with the electrolyte pre-mixture, the electrode/electrolyte assembly was left at room temperature for 24 h to facilitate the gelation of the electrolyte inside the porosity of the film. The cell was then sealed inside a pouch of Kapton sheets. Mini alligator clips with attached metal wires were clamped onto the electrical contact pads of a pair, or an array of electrically connected pairs, of interdigitated, reduced graphene oxide electrodes on the surface of the porous PVDF film to measure the electrochemical responses of various devices.

Example 2. Electrochemical Evaluation of the Single Layer Capacitive Energy Storage Device The electrochemical response of capacitive energy storage devices produced according to the method of Example 1 was characterized by cyclic voltammetry (CV) and electrochemical impedance spectroscopy (EIS) using a Biologic VSP potentiostat.

Open circuit potential measurements were performed for 1 hour before every electrochemical test, to ensure a stable electrochemical condition. A fluctuation of less than 10 mV of the open circuit potential sustained for a period of 1000 s was considered as a stable electrochemical condition. CV tests were then performed over the target voltage range at the target scan rate, generally repeated for 100 cycles. EIS tests were carried out by applying a sinusoidal potential wave at the open circuit potential with an amplitude of 10 mV. The impedance response was measured over frequencies between 1 MHz and 10 mHz, recording 6 points per decade of frequency.

Figure 20:
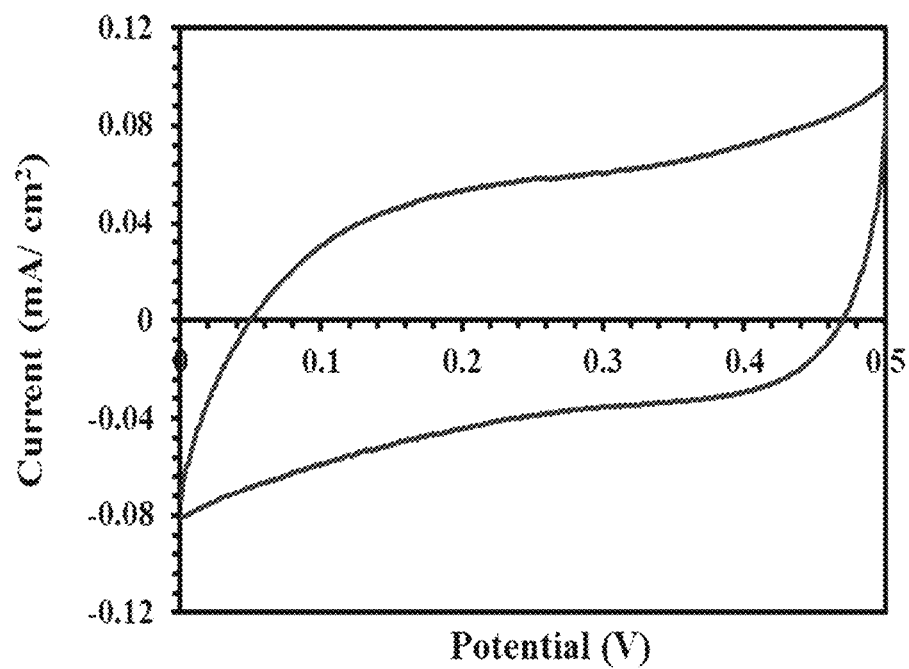
FIG. 20 is an optical microscope image of a printed electrode pair on a PVDF film with a zig-zag configuration, produced according to the method of Example 1.
Figure 21:
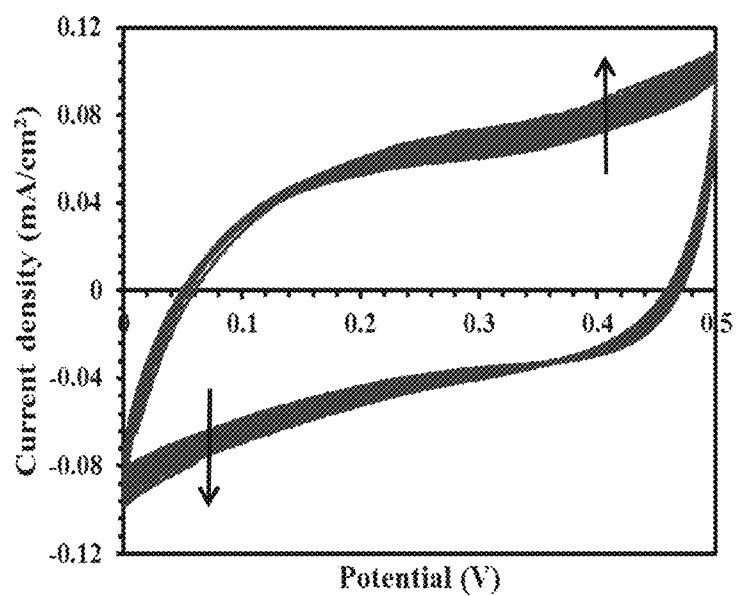
FIG. 21 depicts graphs of the point-to-point electrical resistivity of printed graphene oxide electrodes after reduction via a number of different reduction procedures.

The CV response of a single pair of printed and reduced interdigitated electrodes (four fingers, finger width approximately 90 microns, finger length approximately 890 microns, out-of-plane thickness approximately 50 nm, inter-electrode separation distance approximately 100 microns) was measured between 0-0.5 V at a scan rate of 10 mV/s. The CV response is nearly rectangular, as depicted in FIG. 20, indicative of close to ideal capacitive behaviour and low internal resistivity. The energy storage capacity of the device increased slightly over the first 20 cycles, as depicted in FIG. 21, and then remained substantially unchanged over an additional 80 cycles. The specific capacitance of the single electrode pair capacitive energy storage device was calculated as approximately 3 mF/cm$^2$, while a high cyclability at 10 mV/s was demonstrated.

Figure 22:
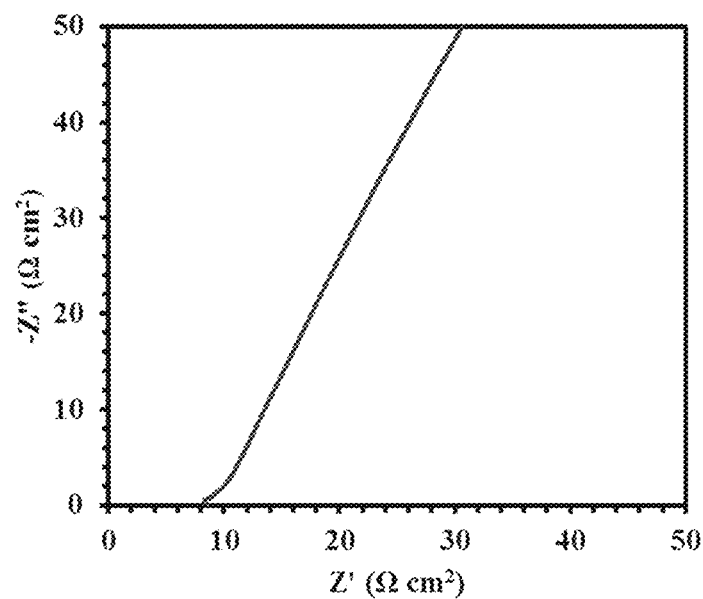
FIG. 22 is a photograph of a porous PVDF film with hydroiodic acid reduced graphene oxide electrodes disposed on a surface thereof, produced according to the method of Example 1.

In agreement with the CV response, the Nysquist plot of the same single electrode pair device also shows excellent capacitive behaviour, as shown in FIG. 22. The equivalent series resistance was calculated to be 8 Ωcm$^2$.

Figure 23:
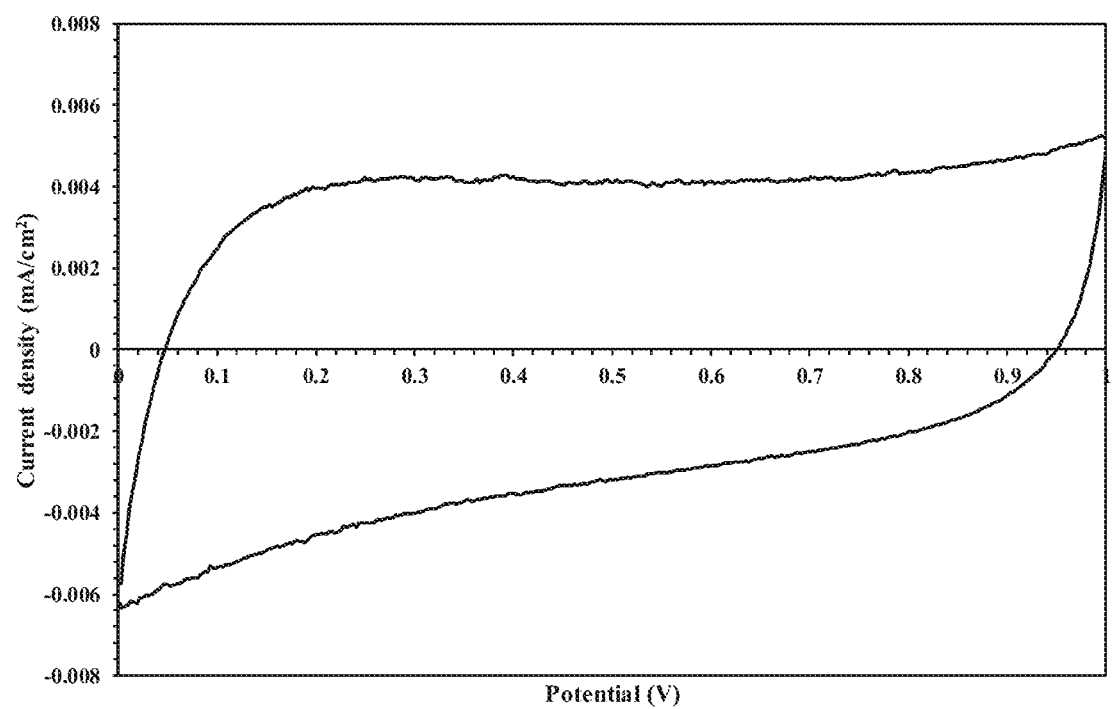
FIG. 23 is a photograph of a capacitive energy storage device, produced according to the method of Example 1, and connected to an external circuit via alligator clips.
Figure 24:
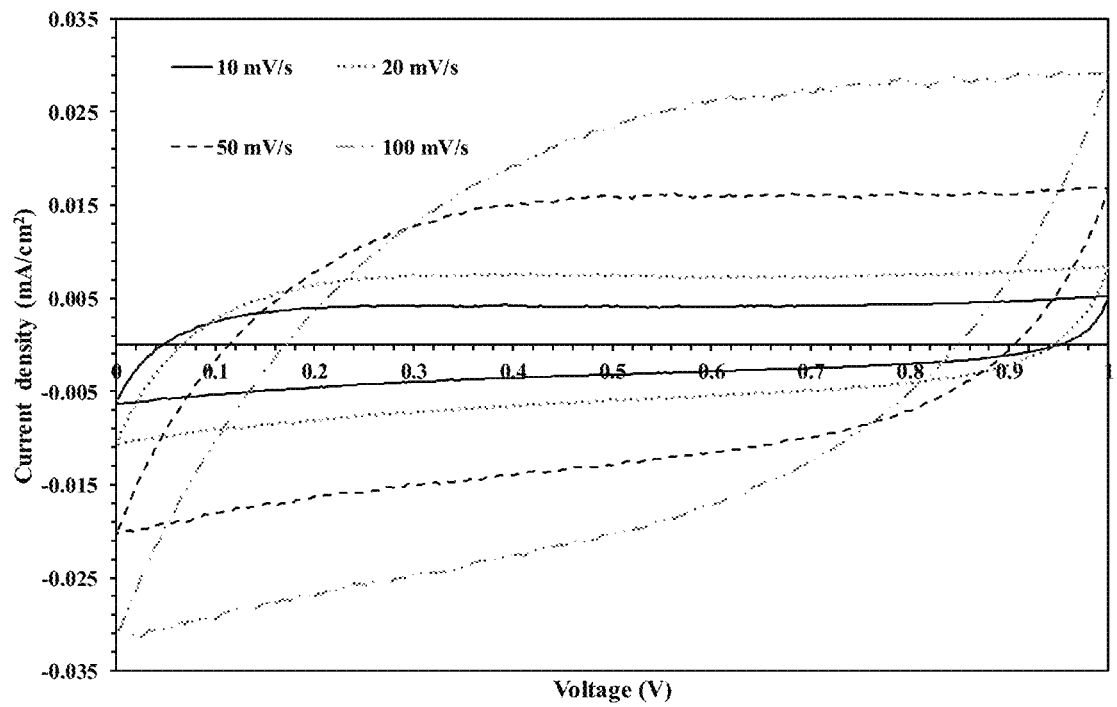
FIG. 24 is a graph of the electrochemical response in the first cycle of a single-layer capacitive energy storage device produced according to the method of Example 1, as measured via cyclic voltammetry in Example 2.

The electrochemical response of another single pair of printed and reduced interdigitated electrodes (zig-zag configuration, inter-electrode separation distance 30 microns, as depicted in FIG. 18) was also investigated, this time measured between 0-1 V at a scan rate of 10 mV/s. The CV response is again nearly rectangular, as seen in FIG. 23, indicative of close to ideal capacitive behaviour and low internal resistivity. The continued rectangular nature of the CV response with increasing scan rates up to 100 mV/s, as seen in FIG. 24, suggests high rate capability of these miniaturised printed electrodes.

Figure 25:
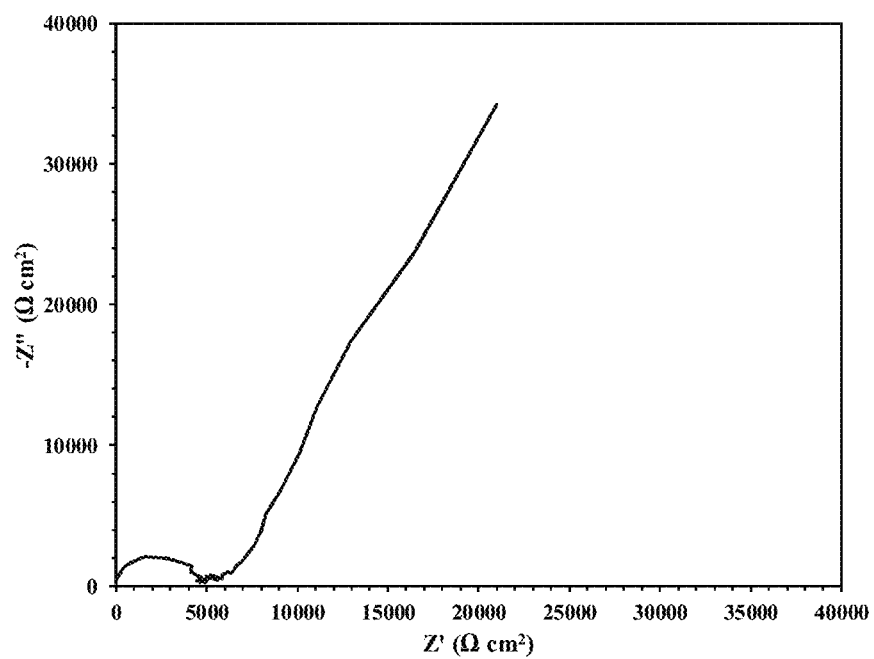
FIG. 25 is a graph of the electrochemical response over the first 20 cycles of a single-layer capacitive energy storage device, produced according to the method of Example 1, as measured via cyclic voltammetry in Example 2.

The Nysquist plot of the single electrode pair device also shows capacitive behaviour, as shown in FIG. 25. The equivalent series resistance was calculated to be 12 Ωcm$^2$, which is very similar to that for the larger printed electrodes.

Example 3. Comparative

Graphene oxide ink, prepared according to the procedure of Examples 1a)-b), was printed onto flexible polymeric films according to the procedure of Example 1c). As described in Example 1, high resolution separated electrode pairs with well-defined features of less than about 30 microns could be printed on porous PVDF films. By contrast, the printing of interdigitated electrodes was unsuccessful on non-porous cellulose acetate films. The ink coalesced on the surface, resulting in a complete loss of printed definition. It is thus believed that wicking of the aqueous phase of the ink into the pores of the PVDF film during printing contributes to the high resolution of electrode features that was achieved.

Example 4. Preparation of a Stacked Capacitive Energy Storage Device

4a) Stacking and Electrical Connection of Multiple Layers

Three porous PVDF films, each having a pair of interdigitated, reduced graphene oxide electrodes disposed on top of the film surface, were prepared by the method of Example 1a)-d). The electrode pairs comprised four-finger electrodes with a finger width of approximately 90 microns, finger length of approximately 1800 microns, out-of-plane thickness of approximately 50 nm, and inter-electrode separation distance of approximately 200 microns. Each electrode was connected to a reduced graphene oxide contact pad (2 mm×2 mm) on the film surface. Wax coating was deposited between each electrode and the contact pads as described in example 1e). Precise holes with a diameter of 0.8 mm were then created through the electrical contact pads and underlying film of each layer, using a precision hole puncher with a diameter of 0.8 mm.

The three layers were then stacked directly on top of each other, such that the holes in each layer were vertically aligned. A highly conductive epoxy adhesive, containing silver nanoparticles and having a paste-like consistency, was then injected through the holes in the electrical contacts of the pre-stacked electrodes using a syringe with a 0.5 mm needle opening, such that the epoxy came into contact with the electrical contact pads of each layer. After deposition, the epoxy adhesive was cured at room temperature for 24 hours. The establishment of electrical connections through the three substrate layers were confirmed using a digital multimeter. As a result of the electrical connection, the electrode pairs on each layer were electrically connected in parallel.

4b) Cell Assembly and Electrolyte Infiltration

An electrolyte mixture was prepared by mixing polyvinyl alcohol (PVA, 3 g) in deionised water (30 ml), and adding $H_2SO_4$ (98%, 3 g) dropwise. The mixture (8.33 wt % PVA) was heated to 85° C. with vigorous stirring for 1 hour, and cooled to room temperature. The low viscosity electrolyte mixture was then drop cast onto the stack of porous film and subsequently dried under ambient condition for 24 hours. The infiltration of the three layer stack with electrolyte could be visibly observed, as the entire stack became transparent. The cell was then sealed inside a pouch of Kapton sheets. Two mini alligator clips with attached metal wires were then clamped onto the stack to measure the electrochemical response of the stacked energy storage device. Each clip was electrically connected to one electrode on each layer via the electrical contact pads on the top layer and the conductive epoxy connections between the layers.

Example 5. (Comparative)

A three-layer stacked device was prepared following the method of Example 4a.

An electrolyte mixture was prepared by mixing polyvinyl alcohol (PVA, 3 g) in deionised water (30 ml), and adding $H_2SO_4$ (98%, 3 g) dropwise. The mixture (8.33 wt % PVA) was heated to 85° C. with vigorous stirring for 1 hour, and cast as a film on a petri dish and dried at 80° C. for 8 hours. The gelled film was then removed from the petri dish, manually placed over the top layer of the stack and pressed onto the stack via a polyimide tape. The electrolyte layer overlying, but not infiltrating, the porous films of the stack was thus placed in ionic communication with the electrode pairs on top of the stack. The cell was sealed inside a pouch of Kapton sheets and alligator clips were attached, as described in Example 4b).

Example 6. Electrochemical Evaluation of Stacked Capacitive Energy Storage Devices The electrochemical response of the stacked capacitive energy storage devices produced according to the method of Examples 4 and 5 was characterized by cyclic voltammetry (CV) and electrochemical impedance spectroscopy (EIS) using a Biologic VSP potentiostat.

Figure 26:
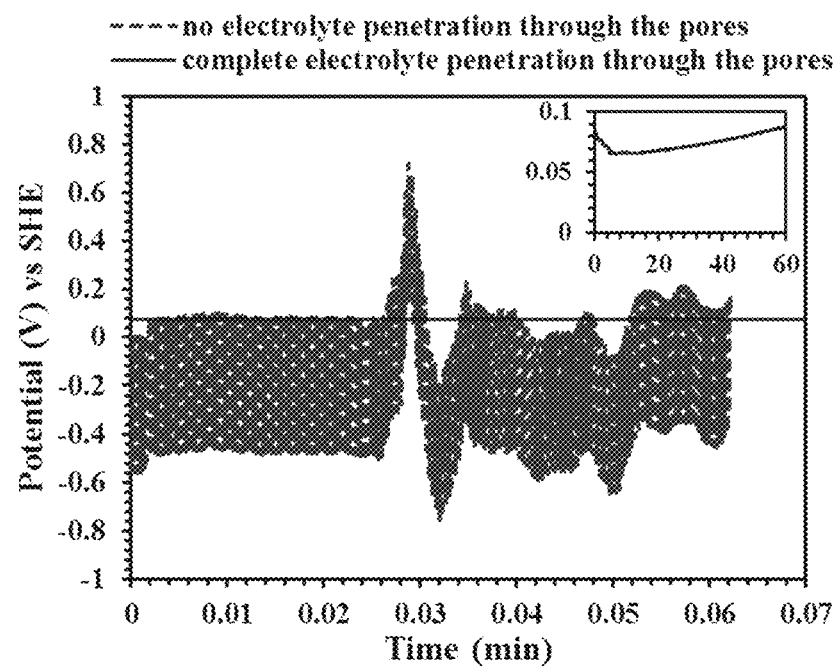
FIG. 26 is a grpah of the performance characteristics of the stacked energy storage device with electrolyte infiltrated through the porosity of the entire stack as prepared in Example 4.

Open circuit potential measurements were initially performed, as described in Example 2, to investigate the effect of electrolyte infiltration through the three porous film layers in the stack. As is evident in FIG. 26, the stacked energy storage device with electrolyte infiltrated through the porosity of the entire stack (as prepared in Example 4) provided steady open circuit potential with very low fluctuation (maximum 30 mV vs SHE). By contrast, large voltage fluctuations (in the range of 600 mV-1.8 V vs SHE) were obtained with the stacked device having only an overlaid electrolyte layer (as prepared in Example 5). This result demonstrates the importance of electrolyte infiltration into the porosity of the porous film of an electrochemical storage device according to the invention.

The CV response of the stacked, electrically connected and electrolyte-infiltrated energy storage device of Example 4, over 100 cycles (0 to 0.5V at a scan rate of 10 mV/s), is shown in FIG. 27. The energy storage capacity of the device increased slightly over the first 20 cycles and then remained substantially unchanged over an additional 80 cycles. The CV plots are approximately rectangular, suggesting capacitive behaviour of the stacked device configuration.

Figure 28:
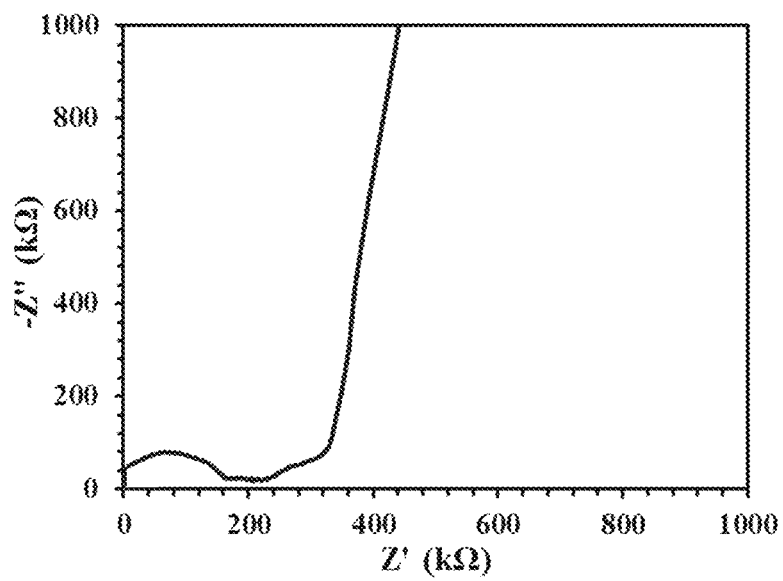
FIG. 28 is a Nyquist plot of a single-layer capacitive energy storage device, as measured via electrochemical impedance spectroscopy in Example 2.

The Nyquist plot of the stacked energy storage device (of Example 4) is shown in FIG. 28. The relatively high resistance (compared with that of the single layer devices depicted in FIGS. 22 and 25) may be attributed to the conductive epoxy connections established between the electrical contact pads on the three layers.

Example 7. Electrode Configurations

In this example, the electrochemical performance of a number of different capacitive microelectrode geometries is investigated. The microelectrodes were not produced in accordance with the present invention; however it is considered that the learnings with respect to the effect of geometry on electrode performance may be used to guide the design of capacitive energy storages devices according to the present invention.

Figure 29:
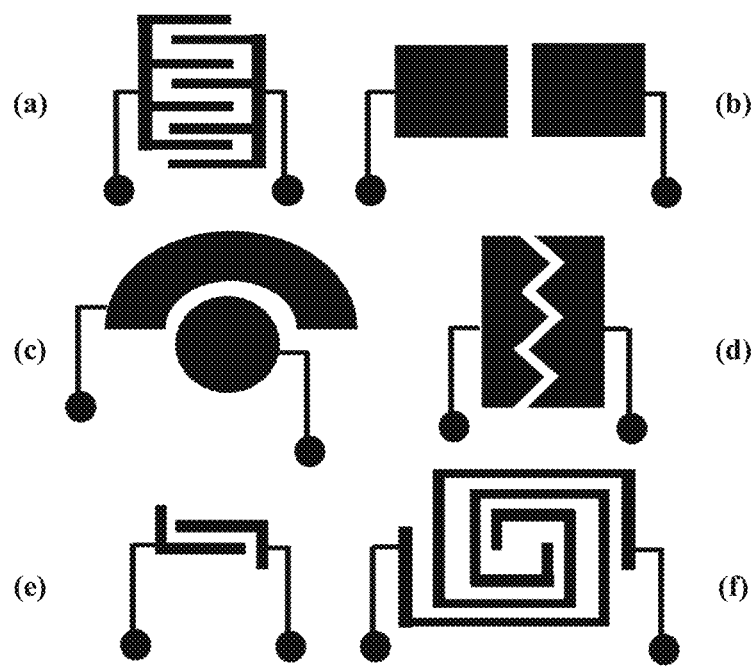
FIG. 29 is a schematic drawing of a number of different separated electrode configurations, as produced and characterised according to the method of Example 3.

A continuous graphene oxide layer (0.6 micron thickness, with an rms roughness of 2.0±0.4 nm) was spin-coated onto a silicon wafer. The wafer was mounted on to a SEM stub with double sided carbon tape, placed into the chamber of a FEI Helios Nanolab 600 FIB-SEM and pumped down to a vacuum level of below $1 \times 10^{-3}$ Pa. Different reduced graphene oxide electrode designs were then produced in the graphene oxide layer using a focused ion beam (FIB) direct write approach, with a FIB fluence of $1 \times 10^{-4}$. FIG. 29 schematically depicts the electrode pair geometries produced in this manner, including (a) interdigitated, (b) pad, (c) concentric, (d) zigzag, (e) L-shape and (f) maze. Each pair of electrodes had the same inter-electrode separation distance, and covered the same surface area on the silicon chip.

The electrochemical characterization was performed in 1 M sodium sulfate using a Biologic VSP potentiostat and a probe station with Pt probes (tip diameter of 5 μm) on the reduced electrical contacts. Cyclic voltammetry (CV) was performed over a potential range of 0-0.5 V vs SHE at different scan rates. Electrochemical impedance spectroscopy (EIS) was performed over a frequency range of 10 mHz-1 MHz by applying a sinusoidal perturbation of 10 mV at the open circuit potential. CV and EIS measurements were also performed on Pt probes in contact with reduced GO to obtain the control current, capacitance and resistance values.

Table 1 shows the capacitances (calculated as $mF/cm^2$) obtained for FIB reduced graphene oxide electrodes with different geometries at a low scan rate of 1 mV/s, normalised to the capacitance values obtained for the interdigitated electrode design. It is evident from Table 1 that geometry affects the capacitance values. The maze geometry shows the lowest capacitance whereas the zigzag design shows the highest. The ESR of all the electrodes was found to be similar, i.e. within experimental error.

TABLE 1

Relative capacitance of microelectrodes with different geometries

| Electrode shape | Capacitance (% relative to interdigitated) |
| --- | --- |
| Interdigitated | 100 |
| Pad | 117 |
| Concentric | 91 |
| ZigZag | 217 |
| L-Shape | 149 |
| Maze | 28 |

Those skilled in the art will appreciate that the invention described herein is susceptible to variations and modifications other than those specifically described. It is understood that the invention includes all such variations and modifications which fall within the spirit and scope of the present invention.

The invention claimed is:

1. A capacitive energy storage device comprising:
   at least one porous film infiltrated with an electrolyte; and
   multiple pairs of separated electrodes disposed on top of a first surface of the porous film, each electrode comprising a capacitive electrode material in direct contact with and in ionic communication with the underlying porous film,
   wherein the multiple pairs of the separated electrodes are electrically connected in series and/or in parallel by conductive linkages on the first surface of the porous film, and the conductive linkages comprising the capacitive electrode material, and
   wherein the electrolyte provides ionic communication between the separated electrodes via the internal porosity of the porous film.

2. The capacitive energy storage device according to claim 1, wherein the pairs of separated electrodes have an inter-electrode separation distance of less than about 50 microns.

3. The capacitive energy storage device according to claim 1, wherein the pairs of separated electrodes comprise interdigitated electrodes having from two to six fingers, wherein the fingers have a width of less than about 50 microns and a length of less than about 250 microns.

4. The capacitive energy storage device according to claim 1, wherein the electrodes are electrically connected to adjacent electrodes and/or an external circuit without a metallic current collector.

5. The capacitive energy storage device according to claim 1, wherein a plurality of the porous films are stacked such that the multiple pairs of the separated electrodes disposed on top of the first surface of a first porous film are in contact with a reverse surface of a second porous film stacked above the first porous film.

6. The capacitive energy storage device according to claim 5, wherein at least one of the separated electrodes disposed on top of the first surface of the first porous film is electrically connected via a conductive pathway with at least one of the separated electrodes disposed on top of the first surface of the second porous film.

7. The capacitive energy storage device according to claim 1, wherein the at least one porous film is a flexible polymeric membrane with a thickness of less than 100 microns.

8. The capacitive energy storage device according to claim 1, wherein the capacitive electrode material comprises reduced graphene oxide.

9. The capacitive energy storage device according to claim 1, wherein the pairs of separated electrodes have an inter-electrode separation distance of less than a thickness of the porous film.

10. The capacitive energy storage device according to claim 1, wherein each pair of separated electrodes covers a surface areas on the porous film of less than about 1 $mm^2$.

11. A stacked capacitive energy storage device comprising:
a first porous film;
multiple pairs of separated electrodes disposed on top of a first surface of the first porous film, each electrode comprising a capacitive electrode material in direct contact with and ionic communication with the underlying first porous film, wherein the multiple pairs of the separated electrodes are electrically connected in series and/or in parallel by conductive linkages on the first surface of the first porous film, the conductive linkages comprising the capacitive electrode material;
a second porous film stacked above the first porous film such that the multiple pairs of the separated electrodes disposed on top of the first surface of the first porous film are in contact with a reverse surface of the second porous film; and
an electrolyte in the internal porosity of the first and second porous films.

12. The stacked capacitive energy storage device according to claim 11, wherein the capacitive electrode material is in ionic communication with the reverse surface of the second porous film, and wherein the electrolyte provides ionic communication between the separated electrodes via the internal porosity of the first and the second porous films.

13. The stacked capacitive energy storage device according to claim 11, further comprising one or more pairs of separated electrodes disposed on top of a first surface of the second porous film, each electrode comprising a capacitive electrode material in ionic communication with the underlying second porous film, and wherein at least one of the separated electrodes disposed on top of the first surface of the first porous film is electrically connected via a conductive pathway with at least one of the separated electrodes disposed on top of the first surface of the second porous film.

14. A method of producing a capacitive energy storage device, the method comprising:
applying a capacitive electrode material or precursor to a first surface of a porous film to form multiple pairs of separated electrodes disposed on top of the first surface, wherein the multiple pairs of the separated electrodes are connected in series and/or in parallel by linkages comprising the capacitive electrode material or precursor; and
infiltrating the porous film with an electrolyte,
wherein the electrolyte provides ionic communication between the separated electrodes via the internal porosity of the porous film.

15. The method according to claim 14, wherein an ink comprising the capacitive electrode material or precursor is printed onto the first surface via gravure or flexogravure printing.

16. The method according to claim 15, further comprising providing the ink for printing onto the first surface, wherein providing the ink comprises concentrating a dispersion of the capacitive electrode material or precursor to increase the viscosity thereof, wherein the capacitive electrode material or precursor is dispersed in an aqueous continuous phase of the dispersion and wherein concentrating the dispersion comprises: i) contacting the dispersion with a water-absorbent solid to absorb water from the aqueous continuous phase into the water-absorbent solid; and ii) thereafter, separating the dispersion from the water-absorbent solid.

17. The method according to claim 14, wherein the separated electrodes have an inter-electrode separation distance of less than about 50 microns, and wherein the at least one porous film is a flexible polymeric membrane with a thickness of less than 100 microns.

18. The method according to claim 14, further comprising stacking a plurality of the porous films such that the multiple pairs of the separated electrodes disposed on top of the first surface of a first porous film are in contact with a reverse surface of a second porous film stacked above of the first porous film.

19. The method according to claim 18, further comprising electrically connecting via a conductive pathway at least one of the separated electrodes disposed on top of the first surface of the first porous film with at least one of the separated electrodes disposed on top of the first surface of the second porous film.

20. The method according to claim 14, wherein the capacitive electrode material or precursor comprises graphene oxide, and wherein the method comprises reducing the graphene oxide on the first surface of the porous film to produce reduced graphene oxide.

\* \* \* \* \*